United States Patent
Aiba et al.

(10) Patent No.: US 8,644,867 B2
(45) Date of Patent: Feb. 4, 2014

(54) MOBILE STATION APPARATUS, COMMUNICATION SYSTEM AND COMMUNICATION METHOD

(75) Inventors: Tatsushi Aiba, Osaka (JP); Shohei Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 403 days.

(21) Appl. No.: 12/988,024

(22) PCT Filed: Feb. 3, 2009

(86) PCT No.: PCT/JP2009/051749
§ 371 (c)(1),
(2), (4) Date: Dec. 15, 2010

(87) PCT Pub. No.: WO2009/128285
PCT Pub. Date: Oct. 22, 2009

(65) Prior Publication Data
US 2011/0092240 A1    Apr. 21, 2011

(30) Foreign Application Priority Data

Apr. 17, 2008 (JP) ................................. 2008-108000

(51) Int. Cl.
*H04B 7/00* (2006.01)
*H04W 72/04* (2009.01)
(52) U.S. Cl.
USPC .................... 455/509; 455/452.1; 455/67.11; 455/453
(58) Field of Classification Search
USPC ........... 455/450, 452.1, 452.2, 509, 524, 515, 455/67.11, 434, 451, 453, 455, 517; 370/329, 252, 328
See application file for complete search history.

(56) References Cited

U.S. PATENT DOCUMENTS

| | | | |
|---|---|---|---|
| 2007/0133458 A1* | 6/2007 | Chandra et al. | 370/329 |
| 2008/0130548 A1* | 6/2008 | Kaikkonen et al. | 370/312 |
| 2010/0150086 A1* | 6/2010 | Harada et al. | 370/329 |
| 2010/0290363 A1* | 11/2010 | Johansson et al. | 370/252 |

FOREIGN PATENT DOCUMENTS

| | | |
|---|---|---|
| JP | 2008-17195 A | 1/2008 |
| WO | WO 2007/044414 A1 | 4/2007 |

OTHER PUBLICATIONS

"Two-layer CQI Scheme for Improved PUCCH Efficiency," 3GPP TSG RAN WG1 Meeting #49bis, R1-073009, 6 pages, Orlando, USA, Jun. 25-29, 2007.

(Continued)

*Primary Examiner* — John J Lee
(74) *Attorney, Agent, or Firm* — Birch, Stewart, Kolasch & Birch, LLP

(57) ABSTRACT

To provide a mobile station apparatus and a communication system that realize an efficient transmission control for a base station apparatus to allocate resources of the PUSCH with appropriate AMC mode in accordance with the channel feedback report and the scheduling request from the mobile station apparatus, and also enable rapid transmission of the uplink data (enable rapid transmission of the UL-SCH) when the mobile station apparatus transmits only the channel feedback report. A mobile station apparatus 200 applied to a system in which a base station apparatus 100 allocates the physical uplink shared channel and the mobile station apparatus 200 transmits uplink data using the physical uplink shared channel, transmits to the base station apparatus 100 the scheduling request requesting the base station apparatus 100 to allocate resources for transmitting the uplink data, using the physical uplink shared channel.

4 Claims, 19 Drawing Sheets

(56) References Cited

OTHER PUBLICATIONS

"Uplink Control Signaling with Persistant Scheduling," 3GPP TSG RAN WG1 Meeting #52, R1-080739, 3 pages, Sorrento, Italy, Feb. 11-15, 2008.

3GPP TS 36.211, V8.2.0 (Mar. 2008), 3rd Generation Partnership Project; Technical Specification Group Radio Access Network; Evolved Universal Terrestrial Radio Access (E-UTRA); Physical Channels and Modulation (Release 8), pp. 1-65, Valbonne, France, 2008.
Partial translation of JP-2008-17195-A, Jan. 24, 2008.

* cited by examiner

MOBILE STATION APPARATUS, COMMUNICATION SYSTEM AND COMMUNICATION METHOD

TECHNICAL FIELD

The present invention relates to a mobile station apparatus that transmits a channel feedback report to a base station apparatus and a communication system.

BACKGROUND ART

3GPP (3rd Generation Partnership Project) is a project to discuss/create specifications of a mobile telephone system based on networks of evolved W-CDMA (Wideband-Code Division Multiple Access) and GSM (Global System for Mobile Communications). In 3GPP, the W-CDMA system has been standardized as the third generation cellular mobile communication system and its services have been launched sequentially. Further, HSDPA (High-Speed Downlink Packet Access) with the communication speed further increased has also been standardized and its services are launched. In 3GPP, the evolution of the third generation radio access technology (hereinafter, referred to as "EUTRA (Evolved Universal Terrestrial Radio Access)" is discussed.

As a downlink communication system in EUTRA, there is proposed an OFDMA (Orthogonal Frequency Division Multiple Access) system in which user multiplexing is performed using subcarriers orthogonal to each other. Further, in the OFDMA system, such a technology has been applied as an adaptive modulation and coding scheme (AMCS) based on adaptive radio link control (Link Adaptation) such as channel coding. AMCS is a scheme, in order to efficiently transmit high-speed packet data, for switching radio transmission parameters (hereinafter, referred to as AMC mode), such as an error correction scheme, coding rate of error correction, and data modulation order, in accordance with the channel quality of each mobile station apparatus. The channel quality of each mobile station apparatus is fed back to the base station apparatus using CQI (Channel Quality Indicator).

In OFDMA, a communicable region can be divided physically into a frequency domain corresponding to subcarriers and a time domain. The several divided regions combined to one unit is called a physical resource block and one or more physical resource blocks are allocated to each mobile station apparatus and communication is established in which a plurality of mobile station apparatuses is multiplexed. In order for the base station apparatus and each mobile station apparatus to establish communication of optimum quality and at speed in accordance with the request, it is necessary to determine allocation to a physical resource block and a transmission scheme in consideration of the channel quality of a frequency band corresponding to each subcarrier in each mobile station apparatus. The determination of the transmission scheme and scheduling are made by the base station apparatus, and therefore, the channel quality for each frequency domain is fed back from each mobile station apparatus to the base station apparatus in order to realize the request. Further, when necessary, information indicative of a frequency domain (for example, one having good channel quality) selected by each mobile station apparatus is fed back to the base station apparatus.

In EUTRA, in order to increase the communication path capacity, the utilization of transmission diversity has been proposed, such as SDM (Space Division Multiplexing) that utilizes MIMO (Multiple Input Multiple Output), SFBC (Space-Frequency Block Coding), or CDD (Cycle Delay Diversity). MIMO is a general term for a multiple-input/multiple-output system or technique and characterized by transmitting using a plurality of antennas on the reception and transmission sides and by setting the number of branches of input/output of radio waves to two or more. The unit of signal sequence that can be transmitted with space division multiplexing by utilizing the MIMO scheme is called a stream. The number of streams (Rank) at the time of the MIMO communication is determined by the base station apparatus in consideration of the channel status. The number of streams (Rank) required by the mobile station apparatus is fed back from the mobile station apparatus to the base station apparatus using RI (Rank Indicator).

When SDM is used in the downlink, preprocessing of the transmission signal sequence in advance (this is called "precoding") has been examined in order to accurately separate information of a plurality of streams transmitted from each antenna. The information of precoding can be calculated based on a channel status estimated by the mobile station apparatus and is fed back from the mobile station apparatus to the base station apparatus using PMI (Precoding Matrix Indicator).

As described above, in order to realize communication with optimum quality, it is required to feed back various pieces of information indicative of a channel status from each mobile station apparatus to the base station apparatus. This channel feedback report (channel status information) is formed by the CQI, PMI, RI, etc. The number of bits and the format of the channel feedback report are specified to the mobile station apparatus by the base station apparatus in accordance with the circumstances.

FIG. 17 is a diagram showing a channel configuration in EUTRA (refer to Non-patent Document 1). Downlink in EUTRA includes a physical broadcast channel (PBCH), a physical downlink control channel (PDCCH), a physical downlink shared channel (PDSCH), a physical multicast channel (PMCH), a physical control format indicator channel (PCFICH), and a physical hybrid ARQ indicator channel (PHICH). Further, Uplink in EUTRA includes a physical uplink shared channel (PUSCH), a physical random access channel (PRACH), and a physical uplink control channel (PUCCH).

In EUTRA, it is not possible for the mobile station apparatus to perform simultaneous transmission using different channels (for example, the PUSCH and the PUCCH) because of the properties of the uplink single carrier. When performing transmission using these channels at the same timing, it is required for the mobile station apparatus to multiplex information in accordance with the definition of the specifications and then transmit the information using a determined channel or to transmit only one piece of information in accordance with the definition of the specifications etc. (other pieces of data are not transmitted (dropped)).

The PUCCH is a channel used to transmit the channel feedback report (CQI, PMI, RI), a scheduling request (SR) for the mobile station apparatus to request for allocation of resources to transmit uplink data (request for transmission of UL-SCH), and uplink control data, such as HARQ ACK/NACK for the downlink transmission.

On the other hand, the PUSCH is mainly used to transmit the uplink data, however, when the data is not transmitted using the PUCCH, the channel feedback report is also transmitted together with the uplink data (UL-SCH) using the PUSCH. That is, the channel feedback report is fed back to the base station apparatus using the PUSCH and/or the PUCCH as a result. In general, in one subframe, the size of a resource to be allocated to transmit the channel feedback report is larger in the PUSCH than in the PUCCH and it is possible to transmit a more detailed channel feedback report (information of about 20 to 100 bits or more when the number of physical resource blocks supported by the base station apparatus and the mobile station apparatus is 65 to 110 (20 MHz system bandwidth). It is only possible for the mobile station apparatus to transmit information about 15 bits or less in one subframe using the PUCCH.

It is possible for the mobile station apparatus to periodically transmit the channel feedback report using the PUCCH. Further, it is also possible for the mobile station apparatus to transmit the channel feedback report using the PUSCH periodically or a-periodically (Non-patent Documents 1 and 2). For example, it is possible for the base station apparatus to permit the mobile station apparatus to periodically transmit, using the PUSCH, the channel feedback report by setting a continuous (persistent) resources of the PUSCH and the period (or period and offset) to transmit the channel feedback report using a RRC signaling (radio resource control signal).

Further, it is also possible for the base station apparatus to permit the mobile station apparatus to periodically transmit, using the PUSCH, the channel feedback report by setting the period (or period and offset) to transmit the channel feedback report using the RRC signaling (radio resource control signal) and transmitting an uplink transmission permission signal (referred to as an uplink grant, L1/L2 grant, scheduling grant, etc., however referred to as an uplink transmission permission signal hereinafter) to initiate transmission of the channel feedback report (to activate the channel feedback report) using the PDCCH. In the case of a periodic channel feedback report, in ordinary cases (except for the case where the uplink transmission permission signal overwrites the periodic channel feedback report etc.), the mobile station apparatus does not transmit the uplink data and the channel feedback report at the same time but transmits only the channel feedback report to the base station apparatus using the PUSCH.

Furthermore, it is possible for the base station apparatus to permit the mobile station apparatus to a-periodically (temporarily, one-shot) transmit, using the PUSCH, the channel feedback report and the uplink data by including one-bit information (channel feedback report request or channel status report trigger) to make a request for the transmission of the channel feedback report in the uplink transmission permission signal. It is also possible for the mobile station apparatus to a-periodically transmit, using the PUSCH, only the channel feedback report. Transmission of only the channel feedback report means that the mobile station apparatus does not transmit the uplink data and the channel feedback report at the same time but transmits only the channel feedback report to the base station apparatus.

In EUTRA, FIG. 18 is a diagram illustrating an example of multiplexing when the mobile station apparatus transmits the uplink data (shown by a lattice pattern), the channel feedback report (shown pale solid black), and ACK/NACK (shown by a mesh pattern) at the same time using the PUSCH. In FIG. 18, in addition to the uplink data, the channel feedback report, and the ACK/NACK, an uplink reference signal (hereinafter, referred to as "RS (Reference Symbol)") used when the mobile station apparatus decodes the information is also illustrated. The RS is shown by a dotted pattern in FIG. 18.

When the mobile station apparatus multiplexes the uplink data, the channel feedback report, and the ACK/NACK, first, the channel feedback report is mapped in the time axis direction. FIG. 18 illustrates that the channel feedback report is mapped first in the time axis direction and after the channel feedback report is mapped in all the regions in the time axis direction (in this example, after the channel feedback report is mapped in the 12 regions except for the RS), the channel feedback report is mapped in the frequency axis direction (time first mapping). Here, the number of regions in which the channel feedback report is mapped differs depending on the MCS (Modulation and Coding Scheme, modulation scheme, and/or coding scheme) of the channel feedback report (the modulation scheme and/or the coding scheme may be fixed to default values).

Subsequently, like the channel feedback report, the uplink data is also mapped in the time axis direction first, and then, mapped in the frequency axis direction (time first mapping). The channel feedback report is mapped at the front (beginning) of the uplink data. After the channel feedback report and the uplink data are mapped with a time first mapping, the ACK/NACK is mapped adjacent to the RS as shown in FIG. 18. At this time, the ACK/NACK is mapped by overwriting the uplink data (this is described as follows: the ACK/NACK is mapped by puncturing the uplink data). The number of regions in which the ACK/NACK can be mapped is four at the most (in the figure, the four regions adjacent to the RS, that is, the third, fifth, tenth and twelfth regions from the smaller values along the time axis of the 14 regions in the time axis direction). The mobile station apparatus transmits the uplink data, the channel feedback report, and the ACK/NACK multiplexed as described above to the base station apparatus at the same time using the PUSCH.

Non-patent Document 1: 3GPP TS (Technical Specification) 36.211, V8.2.0 (2008-03), 3rd Generation Partnership Project; Technical Specification Group Radio Access Network; Evolved Universal Terrestrial Radio Access (E-UTRA); Physical Channel and Modulation (Release 8)

Non-patent Document 2: "Uplink Control Signaling with Persistent Scheduling", 3GPP TSG RAN WG1 Meeting #52, R1-080739, February 2008

Non-patent Document 3: "Two-layer CQI Scheme for Improved PUCCH Efficiency", 3GPP TSG RAN WG1 Meeting #49bis, R1-073009, June 2007

DISCLOSURE OF THE INVENTION

However, with the conventional technique, it is possible for the mobile station apparatus to transmit, using only the PUCCH, the scheduling request to make a request for allocation of resources to transmit the uplink data (request for transmission of the UL-SCH), and not possible to transmit at the same timing of the channel feedback report. In the mobile station apparatus, when the scheduling request and the channel feedback report occur at the same timing, the channel feedback report is not transmitted (dropped) and only the scheduling request is transmitted.

The base station apparatus switches the AMC modes, such as the error correction scheme, coding rate of error correction, and data modulation order to be performed on the information which is transmitted in the downlink in accordance with the channel feedback report transmitted from each mobile station apparatus. When the base station apparatus allocates resources to transmit the uplink data (to transmit the UL-SCH) in accordance with the scheduling request transmitted from the mobile station apparatus, if the channel feedback report is not fed back, it is not possible to allocate resources to transmit the uplink data (to transmit using UL-SCH) with the AMC mode in accordance with the channel quality of the mobile station apparatus.

That is, there is such a problem that it is not possible for the base station apparatus to determine appropriate AMC mode when allocating resources of the PUSCH by a request from the mobile station apparatus. This problem leads to such a problem that it is no longer possible to efficiently perform communication control (scheduling) between the base station apparatus and the mobile station apparatus.

Further, the scheduling request is not transmitted using the PUSCH because of the nature that the scheduling request is used to make a request for allocation of resources to transmit the uplink data. This is because when the mobile station apparatus transmits information using the PUSCH, normally, the uplink data exists (the UL-SCH exists), that is, resources to transmit the uplink data (to transmit the UL-SCH) are allocated.

However, when the mobile station apparatus transmits only the channel feedback report using the PUSCH, the base station apparatus does not allocate resources to transmit the uplink data (to transmit the UL-SCH), and therefore, this supposition does not apply. Hence, when the mobile station apparatus transmits only the channel feedback report using the PUSCH, it is not possible to transmit the scheduling request, and therefore, it is not possible to rapidly transmit the uplink data (it is no longer possible to perform rapid transmission of the UL-SCH) and there is such a problem that a delay occurs when transmitting the uplink data (performing transmission of the UL-SCH).

The present invention has been made in view of such circumstances and an object thereof is to provide the mobile station apparatus and the communication system in which efficient transmission control is realized for the base station apparatus to allocate resources of the PUSCH with appropriate AMC mode in accordance with the channel feedback report and the scheduling request from the mobile station apparatus and at the same time, it is possible for the mobile station apparatus to rapidly transmit the uplink data (it is possible to perform rapid transmission of the UL-SCH) when transmitting only the channel feedback report.

In order to achieve the above-mentioned object, the present invention has taken the following measures. That is, A mobile station apparatus that transmits, to a base station apparatus, a scheduling request using a physical uplink control channel, transmitting, to said base station apparatus, said scheduling request using a physical uplink shared channel in case of receiving, from said base station apparatus, a signal including information instructing transmission of a channel feedback report without uplink data (UL-SCH) using said physical uplink shared channel.

The mobile station apparatus of the present invention is characterized by receiving, from said base station apparatus, a radio resource control signal including information instructing transmission of said channel feedback report without uplink data (UL-SCH).

The mobile station apparatus of the present invention is characterized by receiving, from said base station apparatus, an uplink transmission permission signal including information instructing transmission of said channel feedback report without uplink data (UL-SCH).

The mobile station apparatus of the present invention is characterized by transmitting, to said base station apparatus, said scheduling request together with said channel feedback report without uplink data (UL-SCH).

The mobile station apparatus of the present invention is characterized by mapping said scheduling request at a position adjacent to an uplink reference signal and transmitting, to said base station apparatus, said scheduling request.

The mobile station apparatus of the present invention is characterized by mapping said scheduling request at a position adjacent to an ACK/NACK and transmitting, to said base station apparatus, said scheduling request.

The mobile station apparatus of the present invention is characterized by mapping said scheduling request at a position adjacent to an RI (Rank Indicator) and transmitting, to said base station apparatus, said scheduling request.

The mobile station apparatus of the present invention is characterized by mapping said scheduling request at a position adjacent to an uplink reference signal and at a position on the opposite side of an ACK/NACK adjacent to said uplink reference signal and transmitting, to said base station apparatus, said scheduling request.

A communication method of the present invention is a communication method in which a mobile station apparatus transmits, to a base station apparatus, a scheduling request using a physical uplink control channel, wherein transmitting, to said base station apparatus, said scheduling request using a physical uplink shared channel in case of receiving, from said base station apparatus, a signal including information instructing transmission of a channel feedback report without uplink data (UL-SCH) using said physical uplink shared channel.

The communication method of the present invention is characterized in that said mobile station apparatus receives, from said base station apparatus, a radio resource control signal including information instructing transmission of said channel feedback report without uplink data (UL-SCH).

The communication method of the present invention is characterized in that said mobile station apparatus receives, from said base station apparatus, an uplink transmission permission signal including information instructing transmission of said channel feedback report without uplink data (UL-SCH).

The communication method of the present invention is characterized in that said mobile station apparatus transmits, to said base station apparatus, said scheduling request together with said channel feedback report without uplink data (UL-SCH).

The communication method of the present invention is characterized in that said mobile station apparatus maps on said physical uplink shared channel, the said scheduling request at a position adjacent to an uplink reference signal and transmits, to said base station apparatus, said scheduling request.

The communication method of the present invention is characterized in that said mobile station apparatus maps said scheduling request at a position adjacent to an ACK/NACK and transmits, to said base station apparatus, said scheduling request.

The communication method of the present invention is characterized in that said mobile station apparatus maps said scheduling request at a position adjacent to an RI (Rank Indicator) and transmits, to said base station apparatus, said scheduling request.

The communication method of the present invention is characterized in that said mobile station apparatus maps said scheduling request at a position adjacent to an uplink reference signal and at a position on the opposite side of an ACK/NACK adjacent to said uplink reference signal and transmits, to said base station apparatus, said scheduling request.

According to the present invention, the mobile station apparatus transmits, to the base station apparatus, the scheduling request using the physical uplink shared channel, and therefore, it is made possible to realize an efficient transmission control for the base station apparatus to allocate the resources of the PUSCH with appropriate AMC mode in accordance with the channel feedback report and the scheduling request from the mobile station apparatus.

Figure 1:
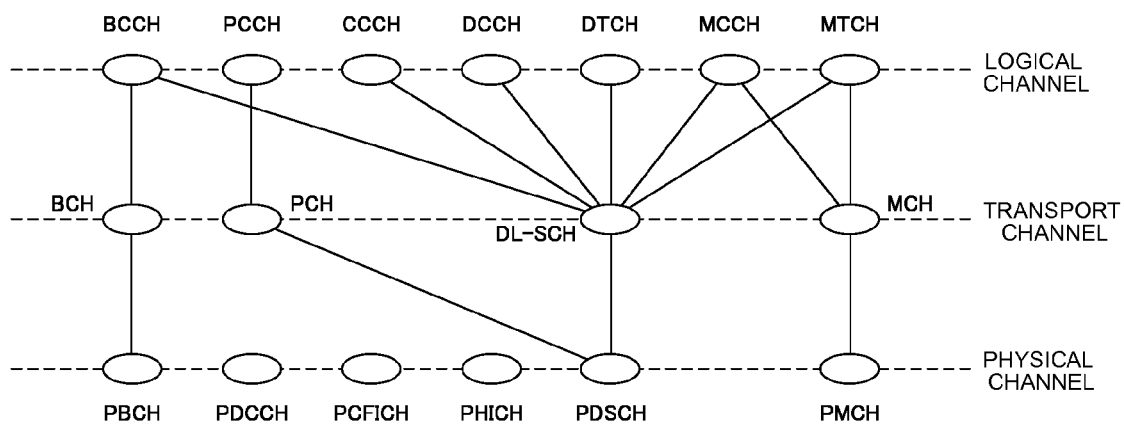
FIG. 1 is a diagram showing a channel configuration in EUTRA.

100 base station apparatus
101 data control section
102 OFDM modulation section
103 radio section
104 scheduling section
105 channel estimation section
106 DFT-S-OFDM demodulation section
107 data extraction section
108 upper layer
109 radio resource control section
200 mobile station apparatus
201 data control section
202 DFT-S-OFDM modulation section
203 radio section
204 scheduling section
205 channel estimation section
206 OFDM demodulation section
207 data extraction section
208 upper layer
209 radio resource control section
210 MBMS control section

BEST MODES FOR CARRYING OUT THE INVENTION

Figure 2:
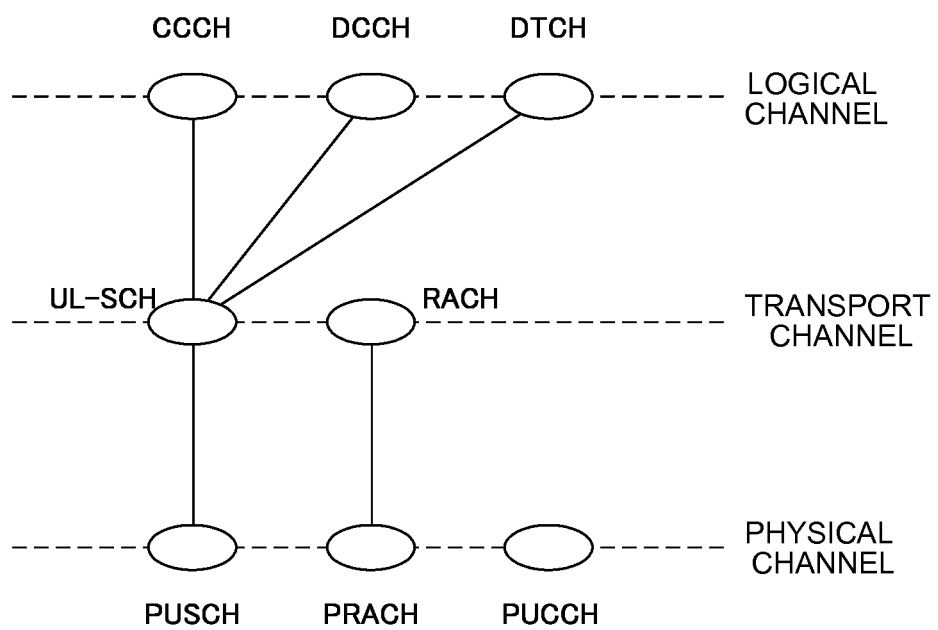
FIG. 2 is a diagram showing a channel configuration in EUTRA.

Next, an embodiment according to the present invention will be described with reference to the drawings. FIG. 1 and FIG. 2 are diagrams each showing a channel configuration in EUTRA. As shown in FIG. 1 and FIG. 2, the channels are classified into logical channels, transport channels, and physical channels. FIG. 1 shows channels on a downlink and FIG. 2 shows channels on an uplink. The logical channel defines the kind of transmission service of data transmitted/received in a medium access control (MAC) layer. The transport channel defines what characteristics data transmitted via a radio interface has and how the data is transmitted. The physical channel is a physical channel to carry a transport channel.

The logical channel includes a broadcast control channel (BCCH), a paging control channel (PCCH), a common control channel (CCCH), a dedicated control channel (DCCH), a dedicated traffic channel (DTCH), a multicast control channel (MCCH), and a multicast traffic channel (MTCH).

The transport channel includes a broadcast channel (BCH), a paging channel (PCH), a downlink shared channel (DL-SCH), a multicast channel (MCH), an uplink shared channel (UL-SCH), and a random access channel (RACH).

Figure 17:
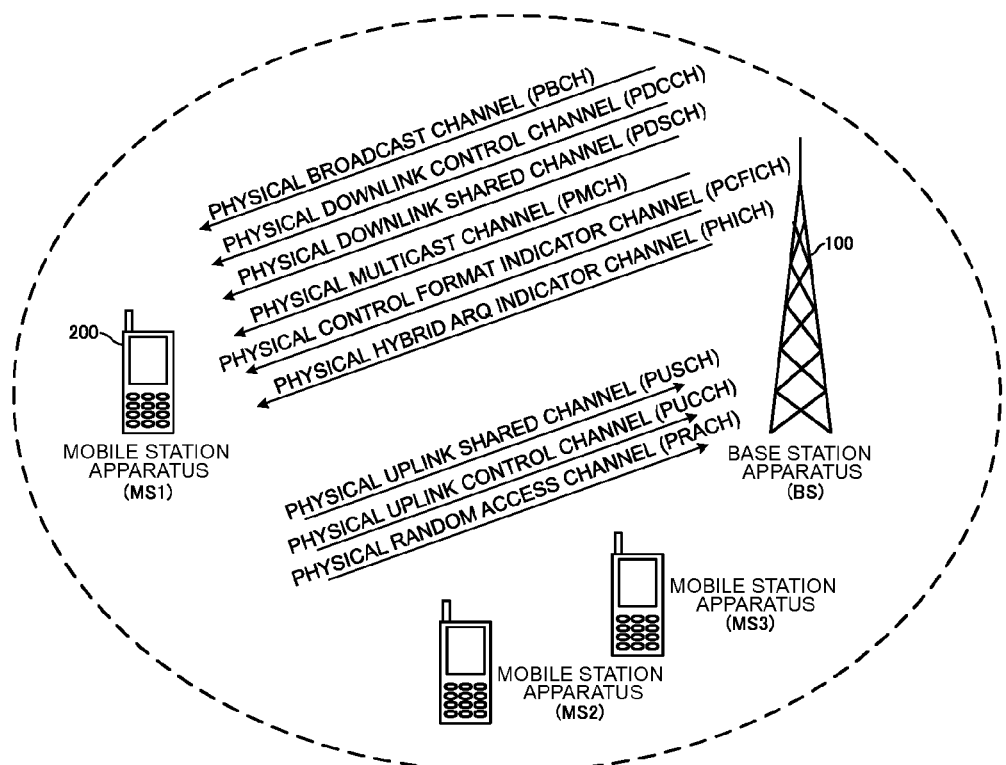
FIG. 17 is a diagram showing a channel configuration in EUTRA.
Figure 18:
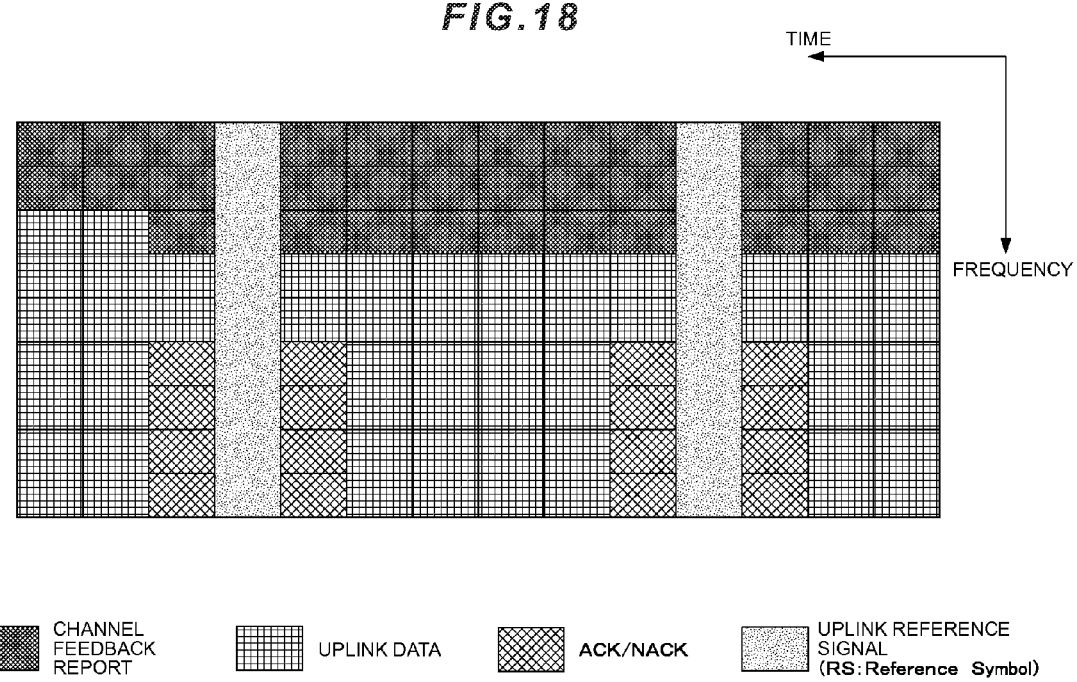
FIG. 18 shows a mapping of a modulation symbol and a resource element in a PUSCH.

The physical channel includes a physical broadcast channel (PBCH), a physical downlink control channel (PDCCH), a physical downlink shared channel (PDSCH), a physical multicast channel (PMCH), a physical uplink shared channel (PUSCH), a physical random access channel (PRACH), a physical uplink control channel (PUCCH), a physical control format indicator channel (PCFICH), and a physical hybrid ARQ indicator channel (PHICH). The concept of each channel described above is as shown in FIG. 17.

The logical channel is explained. The broadcast control channel (BCCH) is a downlink channel used to broadcast system control information. The paging control channel (PCCH) is a downlink channel used to transmit paging information and used when the network does not know the cell location of the mobile station apparatus. The common control channel (CCCH) is a channel used to transmit control information between the mobile station apparatus and the network and used by the mobile station apparatus that does not have a radio resource control (RRC) connection with the network.

The dedicated control channel (DCCH) is a point-to-point bidirectional channel and a channel utilized to transmit individual control information between the mobile station apparatus and the network. The dedicated control channel (DCCH) is used by the mobile station apparatus that has the RRC connection. The dedicated traffic channel (DTCH) is a point-to-point bidirectional channel, a channel dedicated to one mobile station apparatus, and utilized to transfer user information (unicast data). The multicast control channel (MCCH) is a downlink channel used for point-to-multipoint transmission of MBMS control information from the network to the mobile station apparatus. This is used for a multimedia broadcast multicast service (MBMS) (hereinafter, referred to as "MBMS service") that provides the service in a point-to-multipoint manner. Transmission methods of the MBMS service include single-cell point-to-multipoint (SCPTM) transmission and multimedia broadcast multicast service single frequency network (MBSFN) transmission. The MBSFN transmission is a simultaneous transmission technique that is realized by transmitting identifiable waveforms (signals) from a plurality of cells at the same time. On the other hand, the SCPTM transmission is a method of transmitting the MBMS service by a single base station apparatus.

Further, the multicast control channel (MCCH) is utilized by one or more multicast traffic channels (MTCH). The multicast traffic channel (MTCH) is a downlink channel used to transmit traffic data (MBMS transmission data) from the network to the mobile station apparatus in point-to-multipoint transmission. Note that the multicast control channel (MCCH) and the multicast traffic channel (MTCH) are utilized only by the mobile station apparatus that receives the MBMS.

Next, the transport channel is explained. The broadcast channel (BCH) needs to be broadcasted to the entire cell in a fixed and predefined transmission format. The downlink shared channel (DL-SCH) supports the HARQ, dynamic adaptation radio link control, discontinuous reception (DRX), and MBMS transmission and needs to be broadcasted to the entire cell. On the downlink shared channel (DL-SCH) beam forming can be utilized and the dynamic resource allocation and the quasi-static resource allocation are supported. The paging channel (PCH) supports the DRX and needs to be broadcasted to the entire cell. The paging channel (PCH) is mapped to the physical resource dynamically used for the traffic channel or other control channels, that is, to the physical downlink shared channel (PDSCH).

The multicast channel (MCH) needs to be broadcasted to the entire cell. The multicast channel (MCH) supports the quasi-static resource allocation, such as MBMS single frequency network (MBSFN) combining of the MBMS transmission from a plurality of cells and a time frame that uses an extended cyclic prefix (CP). The uplink shared channel (UL-SCH) supports the HARQ and the dynamic adaptation radio link control. Further, on the uplink shared channel (UL-SCH) beam forming can be utilized. The dynamic resource allocation and the quasi-static resource allocation are supported. On the random access channel (RACH), limited control information is transmitted and there is a risk of collision.

Then, the physical channel is explained. The physical broadcast channel (PBCH) maps the broadcast channel (BCH) at intervals of 40 ms. The timing of 40 ms is blind-detected (blind detection). That is, explicit signaling for presenting the timing is not performed. A subframe that includes the physical broadcast channel (PBCH) can perform decoding only by the subframe itself (self-decodable) and is not divided and transmitted in a plurality of times of transmissions.

The physical downlink control channel (PDCCH) is a channel used to notify the mobile station apparatus of the resource allocation of the physical downlink shared channel (PDSCH), the hybrid automatic repeat request (HARQ) information for the downlink data, and the uplink transmission permission (uplink grant) of the resource allocation of the physical uplink shared channel (PUSCH). The physical downlink shared channel (PDSCH) is a channel used to transmit the downlink data or paging information. The physical multicast channel (PMCH) is a channel utilized to transmit the multicast channel (MCH) and the downlink reference signal, the uplink reference signal, and the physical downlink synchronization signal are allocated separately.

The physical uplink shared channel (PUSCH) is a channel used to transmit the uplink data (the UL-SCH) mainly. When the base station apparatus schedules the mobile station apparatus, the channel feedback report (CQI, PMI, RI) and the HARQ acknowledgement (ACK)/negative acknowledgement (NACK) are also transmitted using the PUSCH. The physical random access channel (PRACH) is a channel used to transmit a random access preamble and has a guard time. The physical uplink control channel (PUCCH) is a channel used to transmit the channel feedback report (CQI, PMI, RI), the scheduling request (SR), the HARQ acknowledgement (ACK)/negative acknowledgement (NACK) for the downlink transmission, etc.

The physical control format indicator channel (PCFICH) is a channel utilized to notify the mobile station apparatus of the number of OFDM symbols used for the physical downlink control channel (PDCCH) and transmitted in each subframe. The physical hybrid ARQ indicator channel (PHICH) is a channel utilized to transmit the HARQ ACK/NACK for the uplink transmission.

[Channel Mapping]

As shown in FIG. 1, in the downlink, the mapping of the transport channel and the physical channel is performed as follows. The broadcast channel (BCH) is mapped to the physical broadcast channel (PBCH). The multicast channel (MCH) is mapped to the physical multicast channel (PMCH). The paging channel (PCH) and the downlink shared channel (DL-SCH) are mapped to the physical downlink shared channel (PDSCH). The physical downlink control channel (PDCCH), the physical hybrid ARQ indicator channel (PHICH), and the physical control format indicator channel (PCFICH) are used in the physical channel independently.

On the other hand, as shown in FIG. 2, in the uplink, the mapping of the transport channel and the physical channel is performed as follows. The uplink shared channel (UL-SCH) is mapped to the physical uplink shared channel (PUSCH). The random access channel (RACH) is mapped to the physical random access channel (PRACH). The physical uplink control channel (PUCCH) is used in the physical channel independently.

As shown in FIG. 1, in the downlink, the mapping of the logical channel and the transport channel is performed as follows. The paging control channel (PCCH) is mapped to the paging channel (PCH). The broadcast control channel (BCCH) is mapped to the broadcast channel (BCH) and the downlink shared channel (DL-SCH). The common control channel (CCCH), the dedicated control channel (DCCH), and the dedicated traffic channel (DTCH) are mapped to the downlink shared channel (DL-SCH). The multicast control channel (MCCH) is mapped to the downlink shared channel (DL-SCH) and the multicast channel (MCH).

The multicast traffic channel (MTCH) is mapped to the downlink shared channel (DL-SCH) and the multicast channel (MCH). The mapping from the multicast control channel (MCCH) and the multicast traffic channel (MTCH) to the multicast channel (MCH) is performed at the time of the MBSFN transmission and on the other hand, at the time of the SCPTM transmission, the mapping is performed to the downlink shared channel (DL-SCH). The SCPTM transmission is one of the MBMS service transmission methods to provide the MBMS service in one base station apparatus.

On the other hand, as shown in FIG. 2, in the uplink, the mapping of the logical channel and the transport channel is performed as follows. The common control channel (CCCH), the dedicated control channel (DCCH), and the dedicated traffic channel (DTCH) are mapped to the uplink shared channel (UL-SCH). The random access channel (RACH) is not mapped from the logical channel.

[Radio Frame Configuration]

Figure 3:
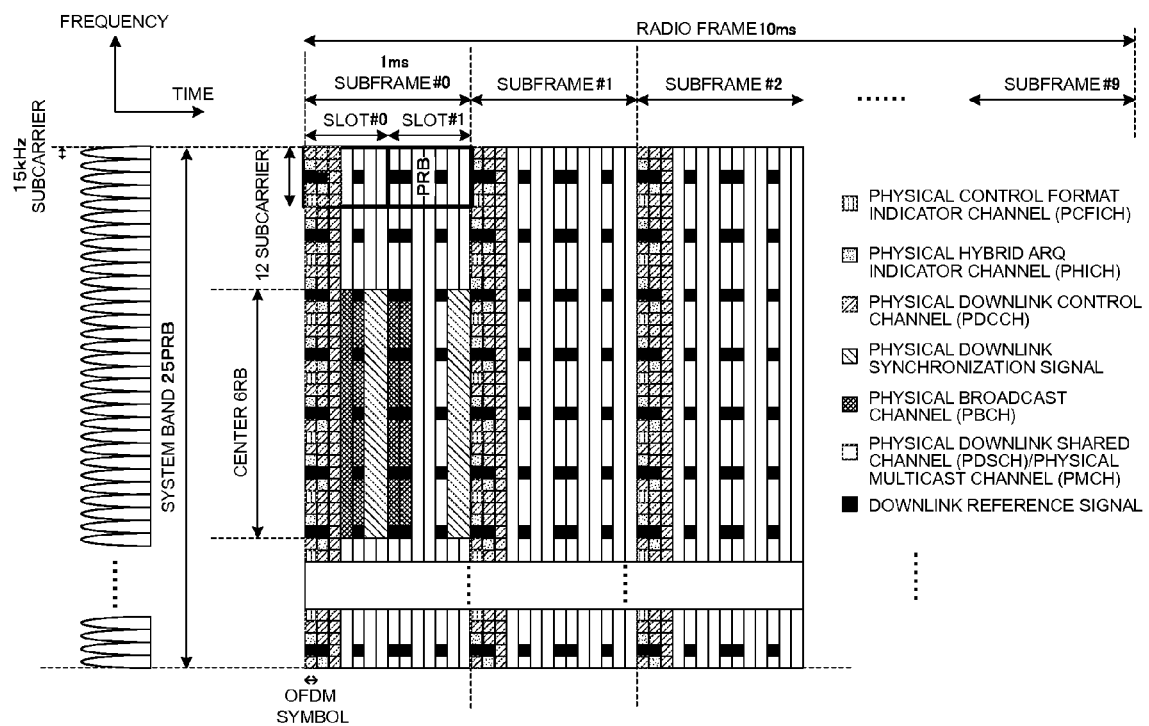
FIG. 3 is a diagram showing a downlink frame configuration in EUTRA.
Figure 4:
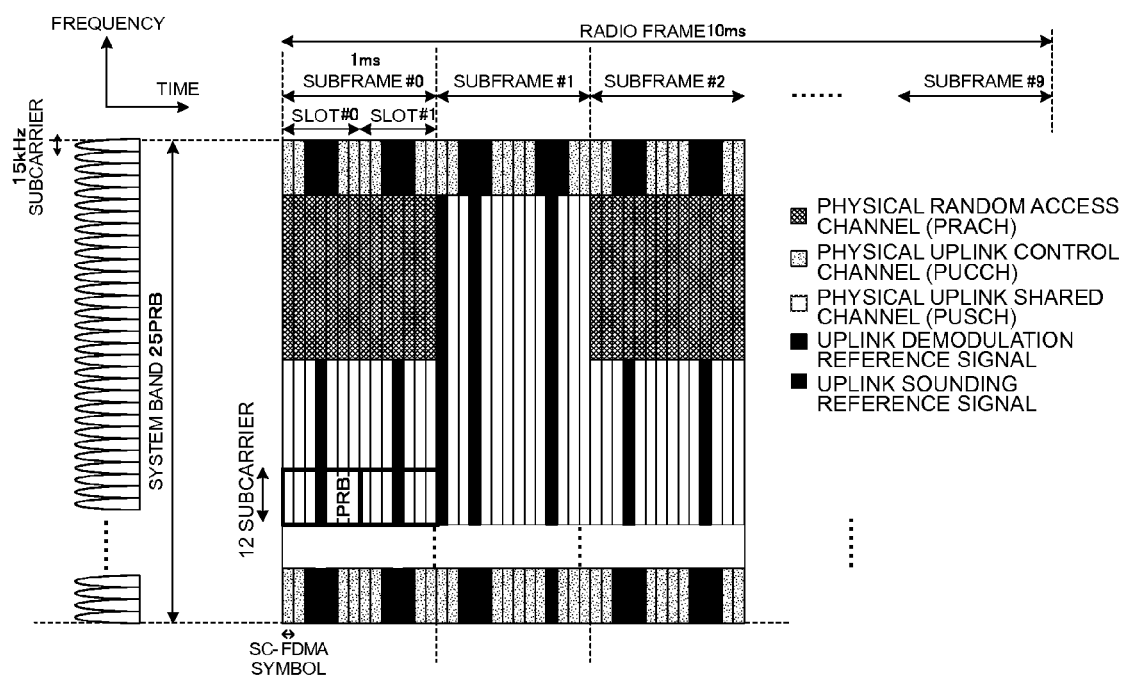
FIG. 4 is a diagram showing an uplink frame configuration in EUTRA.

Next, a frame configuration in EUTRA is explained. FIG. 3 is a diagram showing a downlink frame configuration in EUTRA and FIG. 4 is a diagram showing an uplink frame configuration in EUTRA. The radio frame identified by a system frame number (SFN) is configured in units of 10 ms. One subframe is configured in units of 1 ms and one radio frame includes 10 subframes.

One subframe is separated into two slots. When a normal CP is used, the downlink slot is configured by seven OFDM symbols and the uplink slot is configured by seven SC-FDMA (Single Carrier-Frequency Division Multiple Access) symbols. Note that when an extended CP (also referred to as a "long CP") is used, the downlink slot is configured by six OFDM symbols and the uplink slot is configured by six SC-FDMA symbols.

Further, one slot is divided into a plurality of blocks in the frequency axis direction. One physical resource block (PRB) is configured in units of 12 subcarriers of 15 kHz in the frequency axis direction. The number of physical resource blocks (PRB) supported is between 6 and 110 in accordance with the system bandwidth. The allocation of resources of the uplink and the downlink is performed in units of subframes in the time axis direction and in units of physical resource blocks (PRB) in the frequency axis direction. That is, two slots in a subframe are allocated by one resource allocation signal.

A unit configured by a subcarrier and an OFDM symbol or by a subcarrier and an SC-FDMA symbol is called a resource element. A modulation symbol etc. is mapped to each resource element in the resource mapping processing in the physical layer.

As the processing in the physical layer of the downlink transport channel, the attachment of 24-bit cyclic redundancy check (CRC) for the physical downlink shared channel (PD-SCH), channel coding (transmission path coding), physical layer HARQ processing, channel interleaving, scrambling, modulation (QPSK, 16QAM, 64QAM), layer mapping, precoding, resource mapping, antenna mapping, etc., are performed.

On the other hand, as the processing in the physical layer of the uplink transport channel, the attachment of 24-bit CRC for the physical uplink shared channel (PUSCH), channel coding (transmission path coding), physical layer HARQ processing, scrambling, modulation (QPSK, 16QAM, 64QAM), resource mapping, antenna mapping, etc., are performed.

The physical downlink control channel (PDCCH), the physical hybrid ARQ indicator channel (PHICH), and the physical control format indicator channel (PCFICH) are allocated after the first three OFDM symbols. In the physical downlink control channel (PDCCH), the transport format (modulation scheme, coding scheme, transport block size, etc., are prescribed) for the downlink shared channel (DL-SCH) and the paging channel (PCH), resource allocation, and HARQ information are transmitted. In the physical downlink control channel (PDCCH), the transport format (modulation scheme, coding scheme, transport block size, etc., are prescribed) for the uplink shared channel (UL-SCH), resource allocation, and HARQ information are transmitted. In addition, a plurality of the physical downlink control channels (PDCCH) is supported and the mobile station apparatus monitors the set of the physical downlink control channels (PDCCH).

The physical downlink shared channel (PDSCH) allocated by the physical downlink control channel (PDCCH) is mapped in the same subframe as that of the physical downlink control channel (PDCCH). The physical uplink shared channel (PUSCH) allocated by the physical downlink control channel (PDCCH) is mapped in a subframe at a predetermined position. For example, when the downlink subframe number of the physical downlink control channel (PDCCH) is N, it is mapped in the (N+4)th uplink subframe.

In the allocation of the up/downlink resource by the physical downlink control channel (PDCCH), the mobile station apparatus is identified using 16-bit MAC layer identification information (MAC ID). That is, the 16-bit MAC layer identification information (MAC ID) is included in the physical downlink control channel (PDCCH). Whether or not a control signal is addressed to the own station is determined based on whether or not a cell-radio network temporary identity (C-RNTI), which is a mobile station identifier of its own station, is allocated in the MAC ID included in the physical downlink control channel (PDCCH). Further, identification information reserved to identify broadcast information (BCCH) and paging information (PCCH), respectively, is allocated in the MAC ID. The MAC ID may be identified as the CRC of the physical downlink control channel (PDCCH) or may be identified by the scramble code of the physical downlink control channel (PDCCH). The physical downlink control channel (PDCCH) is identified as an uplink transmission permission signal or downlink resource allocation by its bit size and flag.

The downlink reference signal (downlink pilot channel) used for measuring the downlink status and for demodulating downlink data is allocated in the first and second OFDM symbols and in the third OFDM symbol from the last of each slot. On the other hand, the uplink demodulation reference signal (demodulation pilot (DRS: Demodulation Reference Signal) used for the demodulation of the physical uplink shared channel (PUSCH) is transmitted with the fourth SC-FDMA symbol of each slot. The uplink sounding reference signal (scheduling pilot (SRS: Sounding Reference Signal)) used for measuring the uplink status is transmitted with the head SC-FDMA symbol in the subframe. The demodulation reference signal of the physical uplink control channel (PUCCH) is defined for each format of the uplink control channel and transmitted with the third, fourth, and fifth SC-FDMA symbols of each slot or the second and sixth SC-FDMA symbols of each slot.

Further, the physical broadcast channel (PBCH) and the downlink synchronization signal are allocated in the band of the central six physical resource blocks in the system band. The physical downlink synchronization signal is transmitted with the sixth and seventh OFDM symbols of each slot in the first subframe (subframe #0) and the fifth subframe (subframe #4). The physical broadcast channel (PBCH) is transmitted with the fourth and fifth OFDM symbols of the first slot (slot #0) and the first and second OFDM symbols of the second slot (slot #1) in the first subframe (subframe #0).

The random access channel (RACH) is configured by the bandwidth of the six physical resource blocks in the frequency axis direction and one subframe in the time axis direction. The random access channel is transmitted from the mobile station apparatus to the base station apparatus to make requests (uplink resource request, uplink synchronization request, downlink data transmission resume request, handover request, connection setup request, reconnection request, MBMS service request, etc.) for various reasons.

The physical uplink control channel (PUCCH) is allocated on both ends of the system band and configured in units of physical resource blocks. Frequency hopping is performed so that both ends of the system band are used alternately between slots.

The communication system according to the present embodiment includes a base station apparatus 100 and a mobile station apparatus 200.

[Base Station Apparatus]

Figure 5:
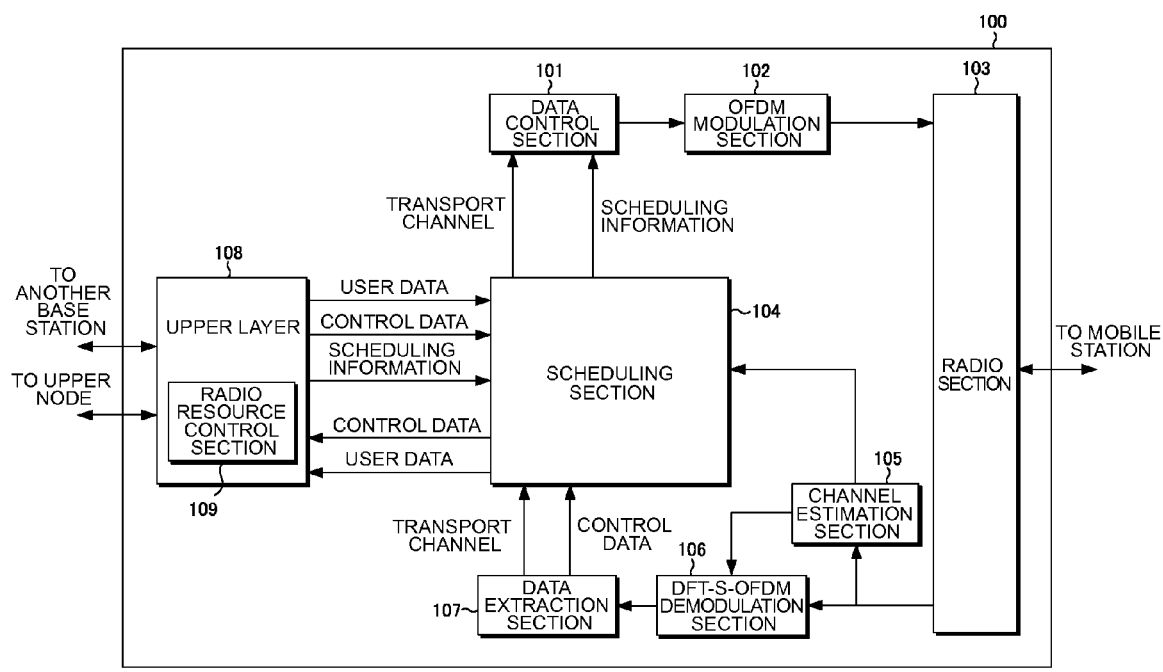
FIG. 5 is a block diagram showing a schematic configuration of a base station apparatus 100 according to an embodiment of the present invention.

FIG. 5 is a block diagram showing a schematic configuration of the base station apparatus 100 according to the embodiment of the present invention. The base station apparatus 100 includes a data control section 101, an OFDM modulation section 102, a radio section 103, a scheduling section 104, a channel estimation section 105, a DFT-Spread-OFDM (DFT-S-OFDM) demodulation section 106, a data extraction section 107, and an upper layer 108. The radio section 103, the scheduling section 104, the channel estimation section 105, the DFT-Spread-OFDM (DFT-S-OFDM) demodulation section 106, the data extraction section 107, and the upper layer 108 constitute a receiving section and the data control section 101, the OFDM modulation section 102, the radio section 103, the scheduling section 104, and the upper layer 108 constitute a transmitting section.

The processing of the uplink physical layer is performed by the radio section 103, the channel estimation section 105, the DFT-Spread-OFDM (DFT-S-OFDM) demodulation section 106, and the data extraction section 107. The processing of the downlink physical layer is performed by the radio section 103, the OFDM demodulation section 102, and the data control section 101.

The data control section 101 receives a transport channel and scheduling information from the scheduling section 104. The transport channel and a signal and a channel generated in the physical layer are mapped to the physical channel based on the scheduling information input from the scheduling section 104. Each piece of data mapped as described above is output to the OFDM modulation section 102.

The OFDM modulation section 102 performs OFDM signal processing on the data input from the data control section 101, such as coding, data modulation, serial/parallel conversion of an input signal, IFFT (Inverse Fast Fourier Transform) processing, CP (Cyclic Prefix) insertion, and filtering, based on the scheduling information (including downlink physical resource block PRB (Physical Resource Block) allocation information (for example, physical resource block positional information, such as frequency and time), modulation scheme and coding scheme for each PRB (for example, 16QAM modulation, ⅔ coding rate) etc.) from the scheduling section 104, generates an OFDM signal, and outputs the signal to the radio section 103.

The radio section 103 generates a radio signal by up-converting the modulated data input from the OFDM modulation section 102 into a radio frequency and transmits it to the mobile station apparatus 200 via an antenna (not shown schematically). Further, the radio section 103 receives the uplink radio signal from the mobile station apparatus 200 via an antenna (not shown schematically), down-converts it into a base band signal, and outputs the received data to the channel estimation section 105 and the DFT-S-OFDM demodulation section 106.

The scheduling section 104 performs processing of a medium access control (MAC) layer. The scheduling section 104 performs mapping of a logical channel and a transport channel, scheduling of the downlink and uplink (HARQ processing, selection of a transport format, etc.), etc.

In the downlink scheduling, the scheduling section 104 performs processing to select a downlink transport format (transmission form) (allocation of physical resource blocks, modulation scheme, coding scheme, etc.) to modulate each piece of data and retransmission control in the HARQ, based on the uplink feedback information received from the mobile station apparatus 200 (downlink channel feedback information (channel status information (channel quality, number of streams, precoding information, etc.), ACK/NACK feedback information for the downlink data, etc.), information about the PRB available for each mobile station apparatus, buffer status, scheduling information input from the upper layer 108, etc. The scheduling information used in the downlink scheduling is output to the data control section 101.

In the uplink scheduling, the scheduling section 104 performs processing to select an uplink transport format (transmission form) (allocation of a physical resource block, modulation scheme, coding scheme, etc.) to modulate each piece of data based on the estimation result of the uplink channel status (radio channel status) output from the channel estimation section 105, the resource allocation request from the mobile station apparatus 200, information about the PRB available for each mobile station apparatus 200, scheduling information input from the upper layer 108, etc. The scheduling information used in the uplink scheduling is output to the data control section 101.

Further, the scheduling section 104 maps the downlink logical channel input from the upper layer 108 to the transport channel and outputs it to the data control section 101. Furthermore, the scheduling section 104 performs processing of the control data input from the data extraction section 107 and acquired by the uplink and the transport channel in accordance with the necessity, and then, maps it to the uplink logical channel and outputs it to the upper layer 108.

The channel estimation section 105 estimates the uplink channel status from the uplink demodulation reference signal (DRS) to demodulate the uplink data and outputs the estimation result to the DFT-S-OFDM demodulation section 106. Further, the channel estimation section 105 estimates the uplink channel status from the uplink sounding reference signal (SRS) to schedule the uplink and outputs the estimation result to the scheduling section 104. Note that the communication scheme of the uplink is supposed to be a single carrier scheme, such as the DFT-S-OFDM, and however the multi-carrier scheme, such as the OFDM scheme, may be used.

The DFT-S-OFDM demodulation section 106 performs demodulation processing by performing DFT-S-OFDM signal processing, such as DFT transform, subcarrier mapping, IFFT transform, and filtering, on the modulated data input from the radio section 103 based on the uplink channel status estimation result input from the channel estimation section 105 and outputs the result to the data extraction section 107.

The data extraction section 107 checks whether the data input from the DFT-S-OFDM demodulation section 106 is correct or erroneous and at the same time, outputs the check result (acknowledge signal ACK/non-acknowledge signal NACK) to the scheduling section 104. Further, the data extraction section 107 separates the data input from the DFT-S-OFDM demodulation section 106 into the transport channel and the control data in the physical layer and outputs them to the scheduling section 104. The separated control data includes the uplink feedback information notified from the mobile station apparatus 200 (downlink channel feedback report CFR, ACK/NACK feedback information for the downlink data) etc.

The upper layer 108 performs processing of a packet data convergence protocol (PDCP) layer, a radio link control (RLC) layer, and a radio resource control (RRC) layer. The upper layer 108 has a radio resource control section 109 (also referred to as a control section). The radio resource control section 109 performs management of information about various settings, management of system information, paging control, management of communication status of each mobile station apparatus, movement management of handover, management of buffer status for each mobile station apparatus, management of connection setup of unicast and multicast bearers, management of a mobile station identifier (UEID), etc.

[Mobile Station Apparatus]

Figure 6:
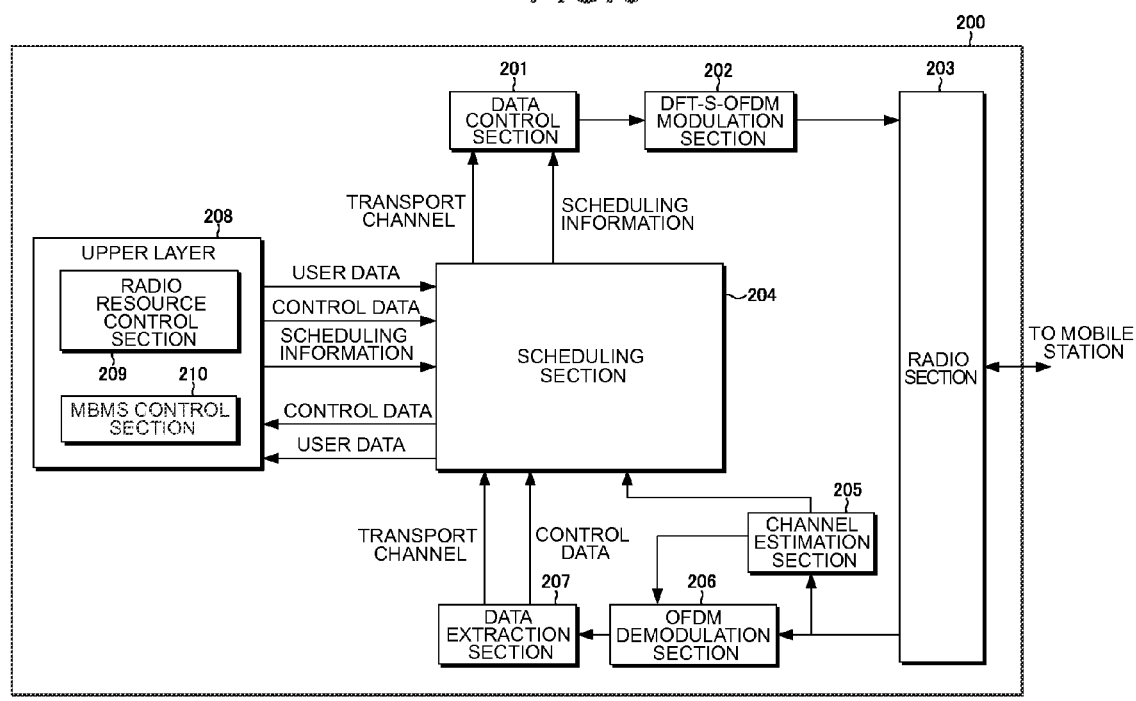
FIG. 6 is a block diagram showing a schematic configuration of a mobile station apparatus 200 according to an embodiment of the present invention.

FIG. 6 is a block diagram showing a schematic configuration of the mobile station apparatus 200 according to the embodiment of the present invention. The mobile station apparatus 200 is configured to include a data control section 201, a DFT-S-OFDM modulation section 202, a radio section 203, a scheduling section 204, a channel estimation section 205, an OFDM demodulation section 206, a data extraction section 207, and an upper layer 208. The data control section 201, the DFT-S-OFDM modulation section 202, the radio section 203, the scheduling section 204, and the upper layer 208 constitute a transmitting section and the radio section 203, the scheduling section 204, the channel estimation section 205, the OFDM demodulation section 206, the data extraction section 207, and the upper layer 208 constitute a receiving section.

The processing of the uplink physical layer is performed by the data control section 201, the DFT-S-OFDM modulation section 202, and the radio section 203. The processing of the downlink physical layer is performed by the radio section 203, the channel estimation section 205, the OFDM demodulation section 206, and the data extraction section 207.

The data control section 201 receives the transport channel and scheduling information from the scheduling section 204. The transport channel and the signal and channel generated in the physical layer are mapped to the physical channel based on the scheduling information input from the scheduling section 204. Each piece of data mapped as described above is output to the DFT-S-OFDM modulation section 202.

The DFT-S-OFDM modulation section 202 performs DFT-S-OFDM signal processing on the data input from the data control section 201, such as data modulation, DFT (Discrete Fourier Transform) processing, subcarrier mapping, IFFT (Inverse Fast Fourier Transform) processing, CP insertion, and filtering, generates a DFT-S-OFDM signal, and outputs the signal to the radio section 103. As the communication scheme of the uplink, the single carrier scheme, such as the DFT-S-OFDM, is supposed, and however the multi-carrier scheme, such as the OFDM scheme, may be used instead.

The radio section 203 generates a radio signal by up-converting the modulated data input from the DFT-S-OFDM modulation section 202 into a radio frequency and transmits it to the mobile station apparatus 100 via an antenna (not shown schematically). Further, the radio section 203 receives a radio signal modulated by the downlink data from the mobile station apparatus 100 via an antenna (not shown schematically), down-converts it into a base band signal, and outputs the received data to the channel estimation section 205 and the OFDM demodulation section 206.

The scheduling section 204 performs processing of a medium access control (MAC) layer. The scheduling section 104 performs mapping of a logical channel and a transport channel, scheduling of the downlink and uplink (HARQ processing, selection of a transport format, etc.), etc. In the downlink scheduling, the scheduling section 204 performs reception control of the transport channel, the physical signal, and the physical channel, the HARQ retransmission control, etc., based on the scheduling information (transport format and HARQ retransmission information) etc. from the base station apparatus 100 and the upper layer 208.

In the uplink scheduling, the scheduling section 204 performs scheduling processing to map the uplink logical channel input from the upper layer 208 to the transport channel, based on the uplink buffer status input from the upper layer 208, the uplink scheduling information (transport format, HARQ retransmission information, etc.) from the base station apparatus 100 input from the data extraction section 207, the scheduling information input from the upper layer 208, etc. As to the uplink transport format, the information notified from the base station apparatus 100 is utilized. This scheduling information is output to the data control section 201.

Further, the scheduling section 204 maps the uplink logical channel input from the upper layer 208 to the transport channel and outputs it to the data control section 201. The scheduling section 204 also outputs the downlink channel feedback report CFR (channel status information) input from the channel estimation section 205 and the CRC check result input from the data extraction section 207 to the data control section 201. Furthermore, the scheduling section 204 performs processing of the control data input from the data extraction section 207 and acquired by the downlink and the transport channel in accordance with the necessity, and then, maps it to the downlink logical channel and outputs it to the upper layer 208.

The channel estimation section 205 estimates the downlink channel status from the downlink reference signal (RS) to demodulate the downlink data and outputs the estimation result to the OFDM demodulation section 206. Further, the channel estimation section 205 estimates the downlink channel status from the downlink reference signal (RS) to notify the estimation result of the downlink channel status (radio channel status) to the base station apparatus 100 and converts the estimation result into downlink channel status feedback information (channel quality information etc.) and outputs it to the scheduling section 204.

The OFDM demodulation section 206 performs OFDM demodulation processing on the modulated data input from the radio section 203 based on the downlink channel status estimation result input from the channel estimation section 205 and outputs the result to the data extraction section 207.

The data extraction section 207 performs CRC on the data input from the OFDM demodulation section 206 to check whether the data is correct or erroneous and at the same time, outputs the check result (ACK/NACK feedback information) to the scheduling section 204. Further, the data extraction section 207 separates the data input from the OFDM demodulation section 206 into the transport channel and the control data in the physical layer and outputs them to the scheduling section 204. The separated control data includes scheduling information, such as the downlink or uplink resource allocation and the uplink HARQ control information.

The upper layer 208 performs processing of a packet data convergence protocol (PDCP) layer, a radio link control (RLC) layer, and a radio resource control (RRC) layer. The upper layer 208 has a radio resource control section 209 (also referred to as a control section) and an MBMS control section 210. The radio resource control section 209 performs management of information about various settings, management of system information, paging control, management of communication status of its own station, movement management of handover, management of buffer status, management of connection setup of unicast and multicast bearers, and management of a mobile station identifier (UEID).

First Embodiment

Subsequently, a first embodiment of the present invention will be described in a communication system using the base station apparatus 100 and the mobile station apparatus 200. In the first embodiment of the present invention, it is possible for the mobile station apparatus to transmit the scheduling request requesting the base station apparatus to allocate resources for transmitting the uplink data, using the physical uplink shared channel (PUSCH). The mobile station apparatus, when having received from the base station apparatus the uplink transmission permission signal, which instructs the mobile station apparatus to transmit the channel feedback report without including the uplink data therein, it is possible to transmit the scheduling request using the resources specified by the uplink transmission permission signal.

It is possible for the mobile station apparatus to transmit the scheduling request and the channel feedback report at the same time using the resources specified by the uplink transmission permission signal from the base station apparatus, which instructs the mobile station apparatus to transmit the channel feedback report without including the uplink data.

The scheduling request is information (signal) to be transmitted when the mobile station apparatus makes a request for allocation of resources for transmitting the uplink data. On the other hand, it is also possible for the base station apparatus to allocate resources for transmitting the uplink data if the mobile station apparatus reports the buffer status of the uplink data (buffer status report). However, the report of the buffer status (buffer status report) is transmitted being included in the uplink data (UL-SCH).

As explained above, the channel feedback report fed back from the mobile station apparatus is formed by the CQI, PMI, RI, etc., and the number of bits (size) and the format of the channel feedback report are set to the mobile station apparatus using the RRC (Radio Resource Control) signaling from the base station apparatus in accordance with the status. It is possible for the mobile station apparatus to periodically transmit the channel feedback report using the PUCCH. It is also possible to transmit periodically or a-periodically using the PUSCH. Here, it is possible for the mobile station apparatus to transmit only the channel feedback report using the PUSCH.

As an example of a request (permission) for the periodic transmission of only the channel feedback report, it is possible for the mobile station apparatus to transmit only the channel feedback report using the PUSCH when resources of the PUSCH is allocated continuously (persistently) to transmit the channel feedback report by the RRC signaling (radio resource control signal) from the base station apparatus. As another example of a request (permission) for the periodic transmission of only the channel feedback report, it is possible for the mobile station apparatus to initiate (activate) the periodic feedback of only the channel feedback report using the PUSCH when the period (or period and offset) to transmit the channel feedback report is set by the RRC signaling from the base station apparatus and the uplink transmission permission signal that includes information (periodic channel feedback report request) to make a request for the periodic channel feedback report is received.

As another example of a request (permission) for the periodic transmission of only the channel feedback report, it may also be possible to initiate (activate) the periodic feedback of only the channel feedback report using the PUSCH by receiving the uplink transmission permission signal including the channel feedback report request at the timing of the period (subframe) set by the base station apparatus. In this case, the channel feedback report request included in the uplink transmission permission signal is also used to make a request for aperiodic channel feedback report. It is possible for the mobile station apparatus to transmit only the channel feedback report at the timing of the period (subframe) set by the base station apparatus when the uplink transmission permission signal with the channel feedback report request set, for example, to "1" is transmitted.

As another example of a request (permission) for the aperiodic or the periodic transmission of only the channel feedback report, it is possible for the mobile station apparatus to transmit only the channel feedback report using the PUSCH when specific information sequences are included in the uplink transmission permission signal, such as when the channel feedback report request is set to "1" and further, part of the transport format is reserved (for example, the value of 5-bit MCS is 11111 etc.). It is possible for the base station apparatus to make a request for the transmission of only the channel feedback report by setting the information sequences included in the uplink transmission permission signal so that the transport block size for the uplink data calculated by the mobile station apparatus is zero. Further, as another example of a request (permission) for the aperiodic or the periodic transmission of only the channel feedback report, it is possible for the mobile station apparatus to transmit only the channel feedback report using the PUSCH by receiving the uplink transmission permission signal (transmission permission signal of only the channel feedback report) defined for the transmission of only the channel feedback report.

In the present embodiment, the uplink transmission permission signal used for a request (permission) for the transmission of only the periodic or the aperiodic channel feedback report from the base station apparatus in the above-mentioned method (control) is called an uplink transmission permission signal including an exclusive transmission request for the channel feedback report. The RRC signaling (radio resource control signal) used for a request (permission) for the transmission of only the periodic channel feedback report from the base station apparatus is called an RCC signaling including an exclusive transmission request for the channel feedback report. Hereinafter, in the present invention, a case of a request (permission) for the transmission of only the channel feedback report to the mobile station apparatus by the base station apparatus transmitting the uplink transmission permission signal including the exclusive transmission request for the channel feedback report is described, and however the present invention can be applied to a case of a request (permission) for the transmission of only the channel feedback report to the mobile station apparatus by the base station apparatus transmitting the RRC signaling including the exclusive transmission request for the channel feedback report. It is possible for the mobile station apparatus, which has received the RRC signaling including the exclusive transmission request for the channel feedback report from the base station apparatus, to transmit the scheduling request and the channel feedback report at the same time using the resources of the physical uplink shared channel (PUSCH) allocated by the RRC signaling.

Hereinafter, in the present invention, the normal uplink transmission permission signal indicates that the mobile station apparatus makes a request (applies for a permission) for the transmission of the uplink data (the UL-SCH) and the uplink transmission permission signal including the exclusive transmission request for the channel feedback report indicates that the base station apparatus makes a request (applies for a permission) for the transmission of only the channel feedback report using the resources of the PUSCH allocated by the base station apparatus with the uplink transmission permission signal by the method (control) in the example described above. The uplink transmission permission signal including a request for the channel feedback report indicates that the base station apparatus makes a request (applies for a permission) for the transmission of the channel feedback report together with the uplink data (the UL-SCH) using the resources of the PUSCH allocated by the base station apparatus with the uplink transmission permission signal.

Figure 7A:
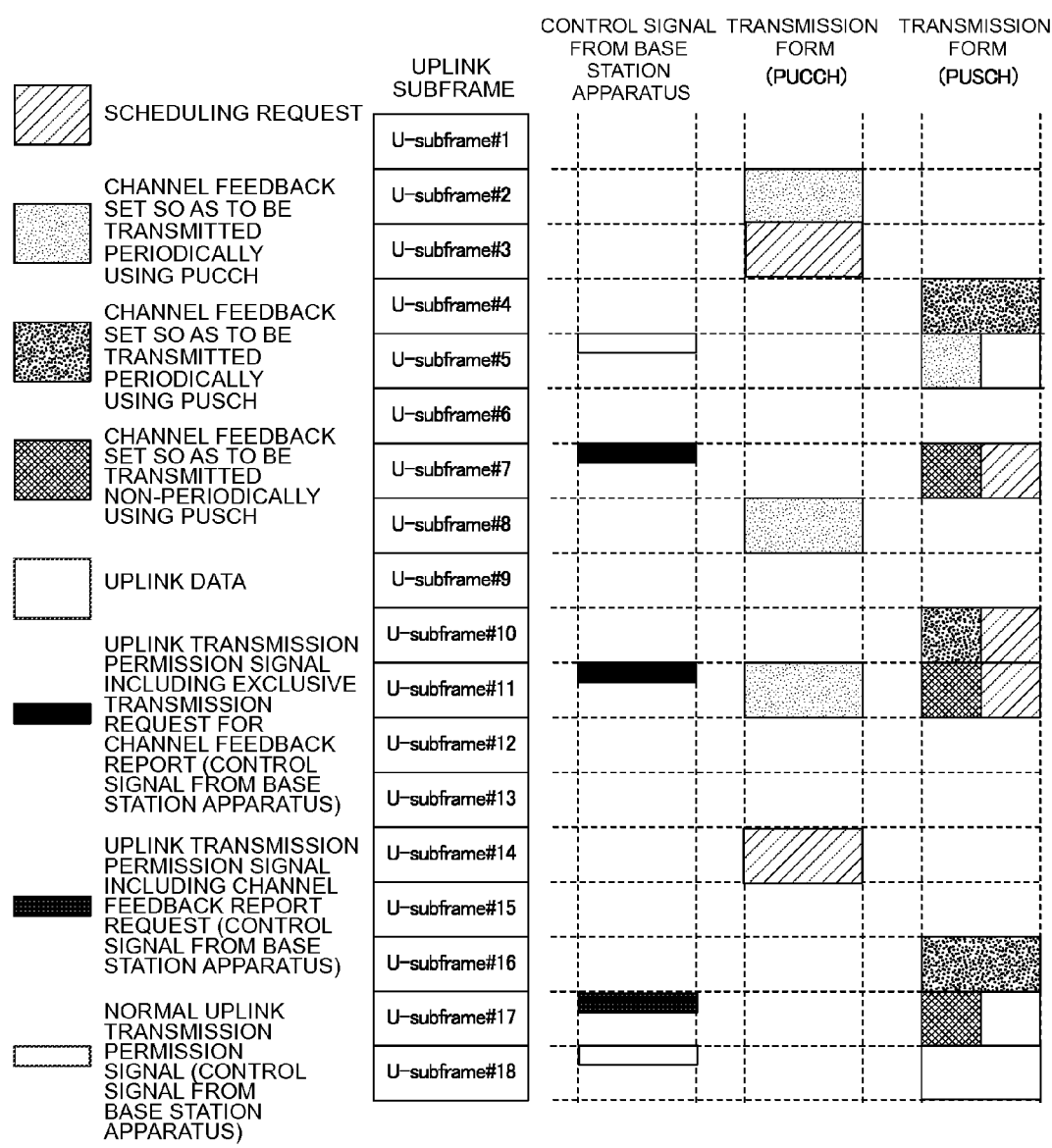
FIG. 7A is a diagram showing a signal corresponding to each subframe of an uplink and a transmission form.
Figure 7B:
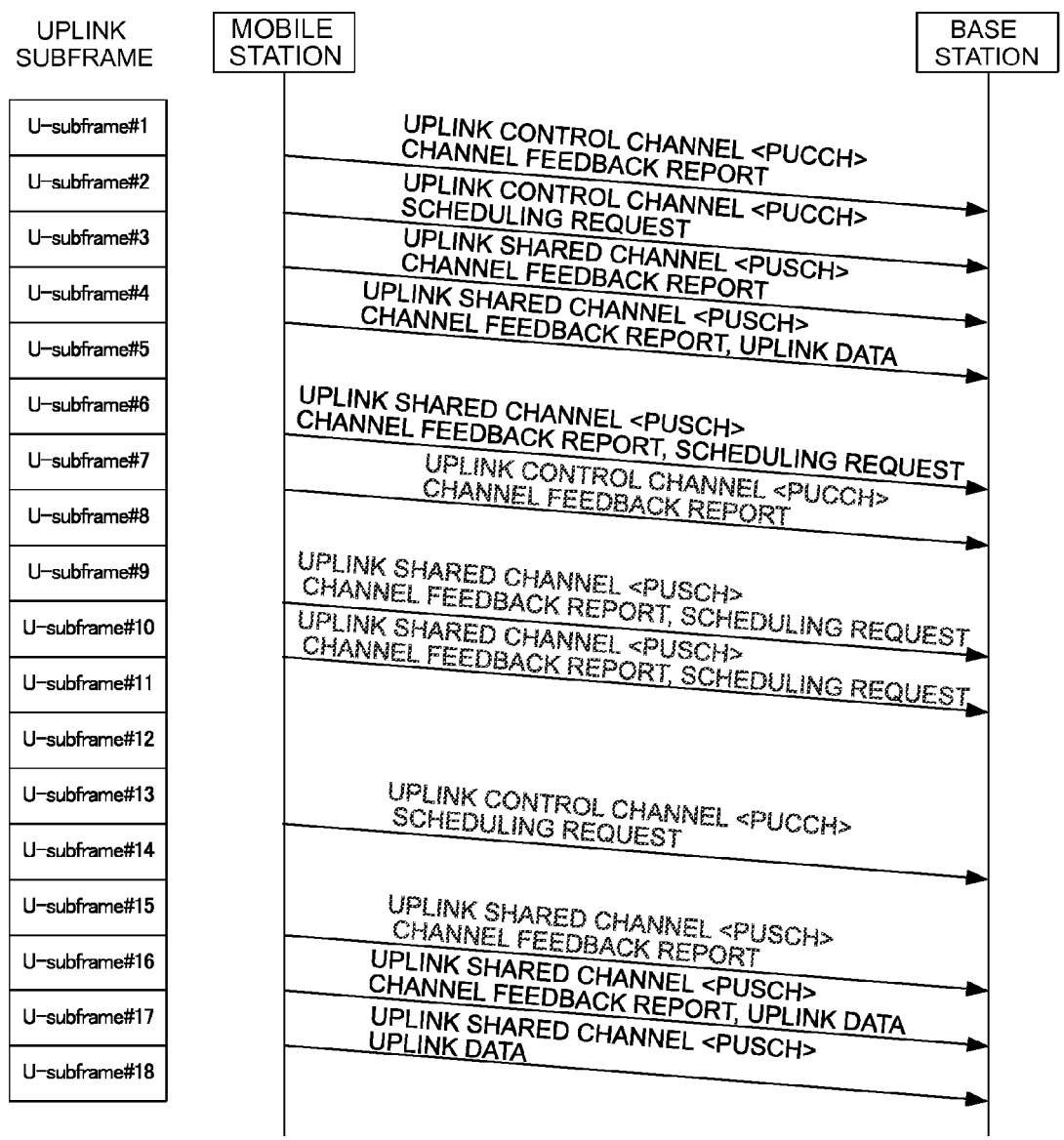
FIG. 7B is a diagram showing a signal corresponding to each subframe of an uplink and a transmission form.

FIG. 7A and FIG. 7B conceptually represent the uplink transmission permission signal transmitted from the base station apparatus to the mobile station apparatus according to the first embodiment of the present invention, the scheduling request (shown by slashes) transmitted from the mobile station apparatus to the base station apparatus, the channel feedback report (shown by a coarse dot pattern) set to be transmitted periodically using the PUCCH, the channel feedback (shown by a fine dot pattern) set to be transmitted periodically using the PUSCH, the channel feedback (shown by a dark, fine dot pattern) set to be transmitted a-periodically using the PUSCH, the uplink data (shown by a white pattern), and the transmission forms of these pieces of information to be transmitted using the PUCCH and PUSCH, respectively.

The uplink transmission permission signal from the base station apparatus shown in white indicates the normal uplink transmission permission signal, that shown in black indicates the uplink transmission permission signal including the exclusive transmission request for the channel feedback report, and that shown by a thick line pattern indicates the uplink transmission permission signal including the channel feedback report request. The subframe for the mobile station apparatus to receive data from the base station apparatus is called a downlink subframe (D-subframe) and the subframe for the mobile station apparatus to transmit data, to the base station apparatus is called an uplink subframe (U-subframe), and in FIG. 7A, for facilitating understanding of the explanation, the uplink transmission permission information to U-subframe #n+4 transmitted with D-subframe #n is shown so as to be allocated in the subframe of U-subframe #n+4.

In FIG. 7B, for facilitating understanding of the explanation, a process flow in each uplink subframe of the mobile station apparatus is shown and FIG. 7A and FIG. 7B correspond to the direction (vertical axis) of the uplink subframe.

Next, the operation in each subframe in FIG. 7A and FIG. 7B is explained. Before the uplink subframe #1, the base station apparatus makes to the mobile station apparatus the resources setting, for the mobile station apparatus, for the scheduling request requesting for allocation of resources to transmit the uplink data, the parameter setting, for the mobile station apparatus, to periodically transmit the channel feedback report using the PUCCH, the parameter setting to periodically transmit the channel feedback report using the PUSCH, and the parameter setting to a-periodically transmit the channel feedback report using the PUSCH.

Here, the resources setting for the mobile station apparatus to transmit the scheduling request may be made periodically. In the present embodiment, for facilitating understanding of explanation, the resources setting to transmit the scheduling request is not made periodically, and it is however possible for the mobile station apparatus to make the resources setting periodically to transmit the scheduling request. The parameter setting to periodically transmit the channel feedback report using the PUCCH is, for example, the format used for periodically transmitting the period (transmission interval), the offset, and the channel feedback report using the PUCCH.

Further, the parameter setting for periodically transmitting the channel feedback report using the PUSCH is, for example, the format used for periodically transmitting the period (transmission interval), the offset, and the channel feedback report using the PUSCH and the parameter setting for a-periodically transmitting the channel feedback report using the PUSCH is, for example, the format used for a-periodically transmitting the channel feedback report.

Hereinafter, the format used when the mobile station apparatus periodically transmits the channel feedback report using the PUCCH is also called a PUCCH base format. The format used when the mobile station apparatus periodically transmits the channel feedback report using the PUSCH is also called a periodic PUSCH base format. The parameter setting for a-periodically transmitting the channel feedback report is, for example, the format used for a-periodically transmitting the channel feedback report. Hereinafter, the format used when the mobile station apparatus a-periodically transmits the channel feedback report using the PUSCH is also called aperiodic PUSCH base format.

Further, the format used for transmitting the channel feedback report indicates, for example, the format to transmit the channel feedback report obtained from the physical resource blocks in a wide band (wide band report), the format to transmit the channel feedback report obtained from the physical resource blocks selected by the mobile station apparatus (mobile station apparatus selected sub band report), the format for the mobile station apparatus to transmit the channel feedback report obtained from the physical resource blocks set by the base station apparatus (base station apparatus selected sub band (high layer setting) report), etc.

It is also possible for the base station apparatus to permit the mobile station apparatus to periodically transmit the channel feedback report using the PUCCH, to periodically transmit the channel feedback report using the PUSCH, and to periodically transmit the channel feedback report using both the PUCCH and the PUSCH at the same time. FIG. 7A and FIG. 7B show that the base station apparatus permits the mobile station apparatus to periodically transmit the channel feedback report using both the PUCCH and the PUSCH, and in these three cases, however, it is possible to apply the embodiment of the present invention. It is also possible for the base station apparatus to permit the mobile station apparatus to transmit the channel feedback report (for example, the channel feedback report by the mobile station apparatus selected format) using a plurality of continuous uplink PUCCH subframes.

An uplink subframe #2 is a subframe set by the base station apparatus so as to periodically transmit the channel feedback report using the PUCCH. The mobile station apparatus transmits the channel feedback report using the PUCCH base format set by the base station apparatus.

An uplink subframe #3 indicates a subframe set by the base station apparatus so as to transmit a scheduling request using the PUCCH and a subframe for which the periodic or the aperiodic channel feedback report using the PUSCH is not requested, and a subframe to which the uplink transmission permission signal requesting the normal uplink data (the UL-SCH) is not transmitted. The mobile station apparatus transmits the scheduling request requesting the allocation of the resources for transmitting the uplink data (requesting the transmission of the UL-SCH) using the PUCCH.

An uplink subframe #4 is a subframe set by the base station apparatus so as to periodically transmit the channel feedback report using the PUSCH. The mobile station apparatus transmits the channel feedback report using the periodic PUSCH base format set by the base station apparatus.

Here, it may also be possible to transmit the scheduling request together with the channel feedback report without exception in a subframe set so as to periodically transmit the channel feedback report without including the uplink data (the UL-SCH) using the PUSCH regardless whether or not the subframe is set so as to transmit the scheduling request using the PUCCH (regardless of the period of the scheduling request). Further, it may also be possible to transmit the scheduling request together with the channel feedback report only in a subframe set so as to transmit the scheduling request and a subframe set so as to periodically transmit the channel feedback report without including the uplink data (the UL-SCH) using the PUSCH and to transmit only the channel feedback report in a subframe not set so as to transmit the scheduling request and a subframe set so as to periodically transmit the channel feedback report using the PUSCH.

An uplink subframe #5 indicates a subframe set by the base station apparatus so as to periodically transmit the channel feedback report using the PUCCH, the subframe further transmitting the uplink transmission permission signal requesting the normal uplink data (the UL-SCH). The mobile station apparatus, which has received the uplink transmission permission signal from the base station apparatus, transmits the uplink data and the channel feedback report at the same time using the PUSCH. At this time, the channel feedback report to be transmitted together with the uplink data at the same time is transmitted using the PUCCH base format set by the base station apparatus. At this time, the scheduling request is not transmitted using the PUSCH.

An uplink subframe #7 indicates a subframe set by the base station apparatus so as to transmit the scheduling request using the PUCCH, the subframe to which the uplink transmission permission signal including the exclusive transmission request for the channel feedback report is further transmitted. It is possible for the mobile station apparatus, which has received the uplink transmission permission signal including the exclusive transmission request for the channel feedback report requesting the transmission of only the channel feedback report from the base station apparatus, to transmit the channel feedback report and the scheduling request at the same time using the PUSCH. At this time, the channel feedback report to be transmitted together with the scheduling request at the same time is transmitted using the aperiodic PUSCH base format set by the base station apparatus.

An uplink subframe #8 is a subframe set by the base station apparatus so as to periodically transmit the channel feedback report using the PUCCH like the uplink subframe #2. The mobile station apparatus transmits the channel feedback report using the PUCCH base format set by the base station apparatus.

An uplink subframe #10 indicates a subframe set by the base station apparatus so as to periodically transmit the channel feedback report using the PUSCH, the subframe being set so that the mobile station apparatus further transmits the scheduling request using the PUCCH. In the uplink subframe #10, it is possible for the mobile station apparatus to transmit the channel feedback report and the scheduling request at the same time using the PUSCH. At this time, the channel feedback report to be transmitted together with the scheduling request at the same time is transmitted using the periodic PUSCH base format set by the base station apparatus.

Here, it may also be possible to transmit the scheduling request together with the channel feedback report without exception in a subframe set so as to periodically transmit the channel feedback report without including the uplink data (the UL-SCH) using the PUSCH regardless whether or not the subframe is set so as to transmit the scheduling request using the PUCCH (regardless of the period of the scheduling request). Further, it may also be possible to transmit the scheduling request together with the channel feedback report only in a subframe set so as to transmit the scheduling request and a subframe set so as to periodically transmit the channel feedback report using the PUSCH, and to transmit only the channel feedback report in a subframe not set so as to transmit the scheduling request and a subframe set so as to periodically transmit the channel feedback report without including the uplink data (the UL-SCH) using the PUSCH.

An uplink subframe #11 indicates a subframe set by the base station apparatus so as to periodically transmit the channel feedback report using the PUCCH, the subframe being set so that the mobile station apparatus transmits the scheduling request using the PUCCH, and further the subframe to which the base station apparatus has transmitted the uplink transmission permission signal including the exclusive transmission request for the channel feedback report. It is possible for the mobile station apparatus, which has received the uplink transmission permission signal including the exclusive transmission request for the channel feedback report from the base station apparatus, to transmit the channel feedback report and the scheduling request at the same time using the PUSCH.

At this time, the channel feedback report to be transmitted together with the scheduling request at the same time is transmitted using the aperiodic PUSCH base format set by the base station apparatus. That is, when the mobile station apparatus, which is set by the base station apparatus so as to transmit the channel feedback report in the PUCCH base format, receives the uplink transmission permission signal including the exclusive transmission request for the channel feedback report, the mobile station apparatus transmits the channel feedback report in the aperiodic PUSCH base format and the scheduling request at the same time (the PUCCH base format used for transmitting the channel feedback report is overwritten by the aperiodic PUSCH base format).

An uplink subframe #14 indicates a subframe set by the base station apparatus so as to periodically transmit the channel feedback report using the PUCCH, the subframe being set so as to transmit the scheduling request using the PUCCH. Further, for this subframe, the periodic or the aperiodic channel feedback report of the PUSCH is not requested nor the uplink transmission permission signal requesting the normal uplink data (the UL-SCH) is not transmitted to this subframe. In the uplink subframe #14, when the mobile station apparatus transmits the scheduling request to indicate that the uplink resources are not enough, the mobile station apparatus does not transmit the channel feedback report (drops the channel feedback report) but transmits the scheduling request to the base station apparatus. When the uplink resource is sufficient, the mobile station apparatus does not transmit the scheduling request (drops the scheduling request) but transmits the channel feedback report to the base station apparatus in this uplink subframe #14.

An uplink subframe #16 is a subframe set by the base station apparatus so as to periodically transmit the channel feedback report using the PUSCH like the uplink subframe #4. The mobile station apparatus transmits the channel feedback report using the periodic PUSCH base format set by the base station apparatus.

Here, it may also be possible to transmit the scheduling request together with the channel feedback report without exception in a subframe set so as to periodically transmit the channel feedback report without including the uplink data (the UL-SCH) using the PUSCH regardless whether or not the subframe is set so as to transmit the scheduling request using the PUCCH (regardless of the period of the scheduling request). Further, it may also be possible to transmit the scheduling request together with the channel feedback report only in a subframe set so as to transmit the scheduling request and a subframe set so as to periodically transmit the channel feedback report using the PUSCH, and to transmit only the channel feedback report in a subframe not set so as to transmit the scheduling request and a subframe set so as to periodically transmit the channel feedback report without including the uplink data (the UL-SCH) using the PUSCH.

An uplink subframe #17 indicates a subframe to which the uplink transmission permission signal including aperiodic channel feedback report request is transmitted from the base station apparatus, the subframe being further set so that the mobile station apparatus transmits the scheduling request using the PUCCH. It is possible for the mobile station apparatus, which has received the uplink transmission permission signal including channel feedback report request requesting the transmission of the channel feedback report together with the uplink data (the UL-SCH) from the base station apparatus, to transmit the channel feedback report and the uplink data (the UL-SCH) at the same time using the PUSCH. At this time, the scheduling request is not transmitted.

An uplink subframe #18 indicates a subframe to which the uplink transmission permission signal requesting the normal uplink data (the UL-SCH) is transmitted from the base station apparatus, the subframe being further set so that the mobile station apparatus transmits the scheduling request using the PUCCH. It is possible for the mobile station apparatus, which has received the uplink transmission permission signal including the uplink data (UL-SCH) from the base station apparatus, to transmit the uplink data (UL-SCH) using the PUSCH. At this time, the scheduling request is not transmitted.

Next, the procedure of processing of the mobile station apparatus shown in FIG. 7B is explained together with the above explanation of the base station apparatus and the mobile station apparatus.

The mobile station apparatus, in which the settings have been made before the uplink subframe #1, such as the resources setting for the scheduling request requesting the allocation of the resources for transmitting the uplink data by the base station apparatus, the setting of the parameters used for periodically transmitting the channel feedback report using the PUCCH, the setting of the parameters used for periodically transmitting the channel feedback report using the PUSCH, and the setting of the parameters used for a-periodically transmitting the channel feedback report using the PUSCH, transmits the channel feedback report according to the settings by the base station apparatus in the subsequent uplink subframe.

The mobile station apparatus, set by the base station apparatus so as to periodically transmit the channel feedback report in the uplink subframe #2 using the PUCCH periodically, transmits the channel feedback report using the PUCCH according to the settings by the base station apparatus. The format used for transmitting the channel feedback report in the uplink subframe #2 is the PUCCH base format set by the base station apparatus.

In the uplink subframe #3, which is set by the base station apparatus so as to transmit the scheduling request using the PUCCH, for which the periodic or the aperiodic channel feedback report using the PUSCH is not requested, and to which the uplink transmission permission signal is not transmitted, the mobile station apparatus transmits the scheduling request requesting the allocation of the resources for transmitting the uplink data (requesting transmission of the UL-SCH) using the PUCCH.

The mobile station apparatus, set by the base station apparatus so as to periodically transmit the channel feedback report in the uplink subframe #4 using the PUSCH, periodically transmits the channel feedback report using the PUSCH according to the settings by the base station apparatus. The format used for transmitting the channel feedback report in the uplink subframe #4 is the periodic PUSCH base format set by the base station apparatus.

The mobile station apparatus, which has further received the uplink transmission permission signal requesting the normal uplink data (the UL-SCH) in the uplink subframe #5 set by the base station apparatus so as to periodically transmit the channel feedback report using the PUCCH, transmits the channel feedback report and the uplink data at the same time using the PUSCH. The format used for transmitting the channel feedback report in the uplink subframe #5 is the PUCCH base format set by the base station apparatus. At this time, the scheduling request is not transmitted using the PUSCH.

It is possible for the mobile station apparatus, which has further received the uplink transmission permission signal including the exclusive transmission request for the channel feedback report in the uplink subframe #7 set by the base station apparatus so as to transmit the scheduling request using the PUCCH, to transmit the channel feedback report and the scheduling request at the same time using the PUSCH. The format used for transmitting the channel feedback report to be transmitted together with the scheduling request at the same time in the uplink subframe #7 is the aperiodic PUSCH base format set by the base station apparatus.

When the transmission of only the channel feedback report is requested (permitted) by the base station apparatus, it is possible for the mobile station apparatus to transmit the scheduling request together with the channel feedback report. The channel feedback report and the scheduling request are transmitted using the resources of the PUSCH allocated by the uplink transmission permission signal including the exclusive transmission request for the channel feedback report from the base station apparatus.

The mobile station apparatus, set by the base station apparatus so as to periodically transmit the channel feedback report using the PUCCH in the uplink subframe #8, like the uplink subframe #2, periodically transmits the channel feedback report using the PUCCH according to the settings by the base station apparatus. The format used for transmitting the channel feedback report in the uplink subframe #8 is the PUCCH base format set by the base station apparatus.

It is possible for the mobile station apparatus to transmit the channel feedback report and the scheduling request at the same time using the PUSCH in the uplink subframe #10 set by the base station apparatus so as to periodically transmit the channel feedback report using the PUSCH and set so that the mobile station apparatus transmits the scheduling request using the PUCCH. The format used for transmitting the channel feedback report to be transmitted together with the scheduling request at the same time in the uplink subframe #10 is the periodic PUSCH base format set by the base station apparatus.

It is possible for the mobile station apparatus to transmit the channel feedback report and the scheduling request at the same time in the subframe set so as to periodically transmit the channel feedback report using the PUSCH. The channel feedback report and the scheduling request are transmitted using the resources of the PUSCH allocated by the base station apparatus for transmitting the periodic channel feedback report. In the base station apparatus, the resources of the PUSCH for transmitting the periodic channel feedback report is allocated by the RRC signaling or the uplink transmission permission signal (including the uplink transmission permission signal including the channel feedback report).

It is possible for the mobile station apparatus, which has received the uplink transmission permission signal including the exclusive transmission request for the channel feedback report, to further transmit the channel feedback report and the scheduling request at the same time using the PUSCH in the uplink subframe #11 set by the base station apparatus so as to periodically transmit the channel feedback report using the PUCCH and set so that the mobile station apparatus transmits the scheduling request using the PUCCH. The format used for transmitting the channel feedback report to be transmitted together with the scheduling request at the same time in the uplink subframe #11 is the aperiodic PUSCH base format set by the base station apparatus.

That is, when having received the uplink transmission permission signal including the exclusive transmission request for the channel feedback report, the mobile station apparatus, set by the base station apparatus so as to periodically transmit the channel feedback report using the PUCCH base format, can transmit the channel feedback report in the aperiodic PUSCH base format and the scheduling request at the same time (can overwrite the PUCCH base format used for transmitting the channel feedback report by the aperiodic PUSCH base format). The channel feedback report and the scheduling request are transmitted using the resources of the PUSCH allocated by the uplink transmission permission signal including the exclusive transmission request for the channel feedback report from the base station apparatus.

When transmitting the scheduling request to indicate that the uplink resources are not enough in the uplink subframe #14 set by the base station apparatus so as to periodically transmit the channel feedback report using the PUCCH and set so as to transmit the scheduling request using the PUCCH, the mobile station apparatus does not transmit (drops) the channel feedback report but transmits the scheduling request to the base station apparatus. When the uplink resources of the mobile station apparatus are sufficient, the mobile station apparatus does not transmit (drops) the scheduling request but transmits the channel feedback report to the base station apparatus.

The mobile station apparatus, set by the base station apparatus so as to periodically transmit the channel feedback report using the PUSCH in the uplink subframe #16, like the uplink subframe #4, periodically transmits the channel feedback report using the PUSCH according to the settings by the base station apparatus. The format used for transmitting the channel feedback report in the uplink subframe #16 is the periodic PUSCH base format set by the base station apparatus.

The mobile station apparatus, which has further received the uplink transmission permission signal including aperiodic channel feedback report in the uplink subframe #17 set by the base station apparatus so that the mobile station apparatus transmits the scheduling request using the PUCCH, transmits the channel feedback report and the uplink data (the UL-SCH) at the same time using the PUSCH. At this time, the scheduling request is not transmitted.

The mobile station apparatus, which has further received the uplink transmission permission signal requesting the normal uplink data (the UL-SCH) in the uplink subframe #18 set by the base station apparatus so that the mobile station apparatus transmits the scheduling request using the PUCCH, transmits the uplink data (the UL-SCH) using the PUSCH. At this time, the scheduling request is not transmitted.

Figure 8:
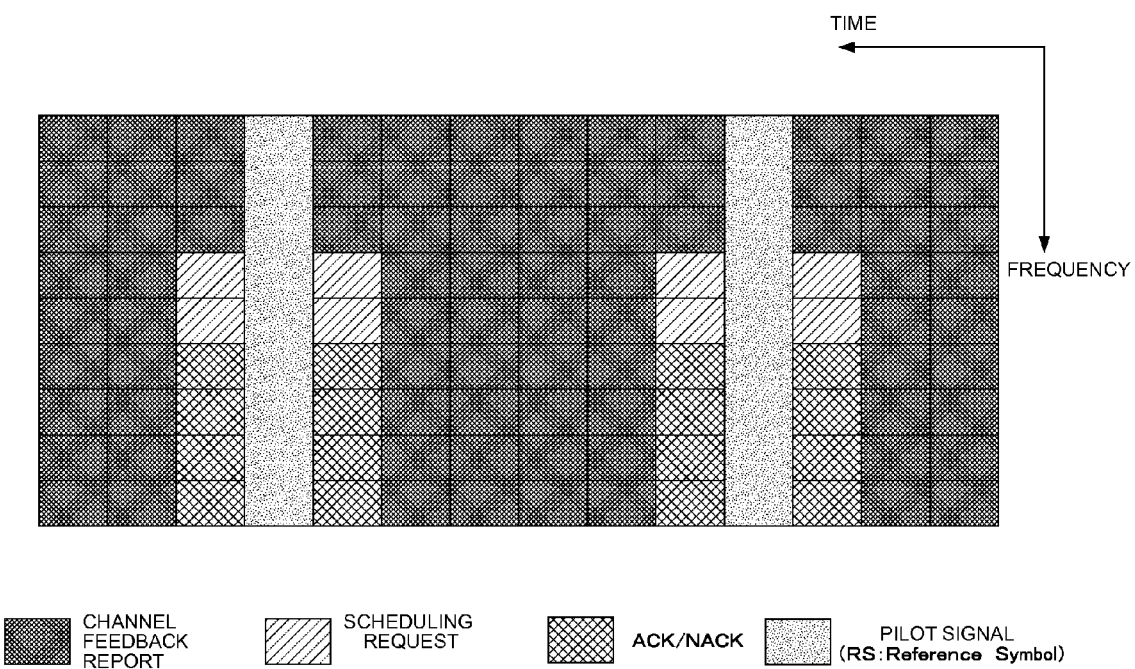
FIG. 8 is a diagram illustrating an example of multiplexing when a mobile station apparatus transmits a channel feedback report and a scheduling request at the same time using a PUSCH.

FIG. 8 is a diagram illustrating an example of multiplexing when the mobile station apparatus transmits the channel feedback report and the scheduling request at the same time using the PUSCH. The scheduling request is transmitted by the transmission/non-transmission control (ON/OFF keying) on the PUCCH, and it is however possible to transmit the scheduling request by a bit control, such as "1: scheduling request" and "0: without scheduling request", on the PUSCH.

When multiplexing the channel feedback report and the scheduling request, the mobile station apparatus maps the scheduling request at a position adjacent to the uplink reference signal with respect to the time axis direction and then multiplexes it with the channel feedback report. In FIG. 8, in addition to the channel feedback report and the scheduling request, the ACK/NACK and the RS for the downlink data are also illustrated. First, the mobile station apparatus maps the channel feedback report in the time axis direction and after mapping the channel feedback report to all the regions in the time axis direction (after the channel feedback report is mapped to 12 regions except for the RS), the mobile station apparatus maps the channel feedback report in the frequency axis direction (time first mapping). Here, the number of regions to which the channel feedback report is mapped differs depending on the MCS (Modulation and Coding Scheme, modulation scheme, and/or coding scheme) of the channel feedback report (the modulation scheme and/or the coding scheme of the channel feedback report may be fixed to default values). After the channel feedback report is mapped to all the regions, the ACK/NACK is mapped adjacent to the RS as shown in FIG. 8. At this time, the ACK/NACK is mapped by overwriting the channel feedback report (this is described as follows: the ACK/NACK is mapped by puncturing the channel feedback report). FIG. 8 shows, as an example, that the ACK/NACK is mapped to the maximum number of regions in which the ACK/NACK can be mapped (the four regions adjacent to the RS, that is, the third, fifth, tenth, and twelfth regions from the side of smaller values along the time axis of the 14 regions in the time axis direction), however, it is possible to map the ACK/NACK in the number of regions less than or equal to the maximum number of regions to which the ACK/NACK can be mapped.

As shown in FIG. 8, the scheduling request is mapped adjacent to the RS like the ACK/NACK. At this time, the scheduling request is mapped by overwriting the channel feedback report (this is described as follows: the scheduling request is mapped by puncturing the channel feedback report). Further, as shown in FIG. 8, the scheduling request is mapped adjacent to the RS and at the same time, mapped adjacent to the ACK/NACK signal. In FIG. 8, the scheduling request is mapped on the top of the ACK/NACK (on the side of lower frequencies), however, it may also be possible to map the scheduling request and the ACK/NACK in the opposite positions. That is, it may also be possible to map the scheduling request on the lower part (on the side of higher frequencies) and to map the ACK/NACK adjacent to the scheduling request. By mapping the scheduling request adjacent to the RS like the ACK/NACK, it is possible to reduce the deterioration in decoding accuracy of the scheduling request due to the channel estimation error in the base station apparatus and to have the same durability as that of the ACK/NACK against the channel variations. Further, by mapping the scheduling request adjacent to the ACK/NACK, it is possible to reduce the burden of processing when decoding each piece of information.

Figure 9:
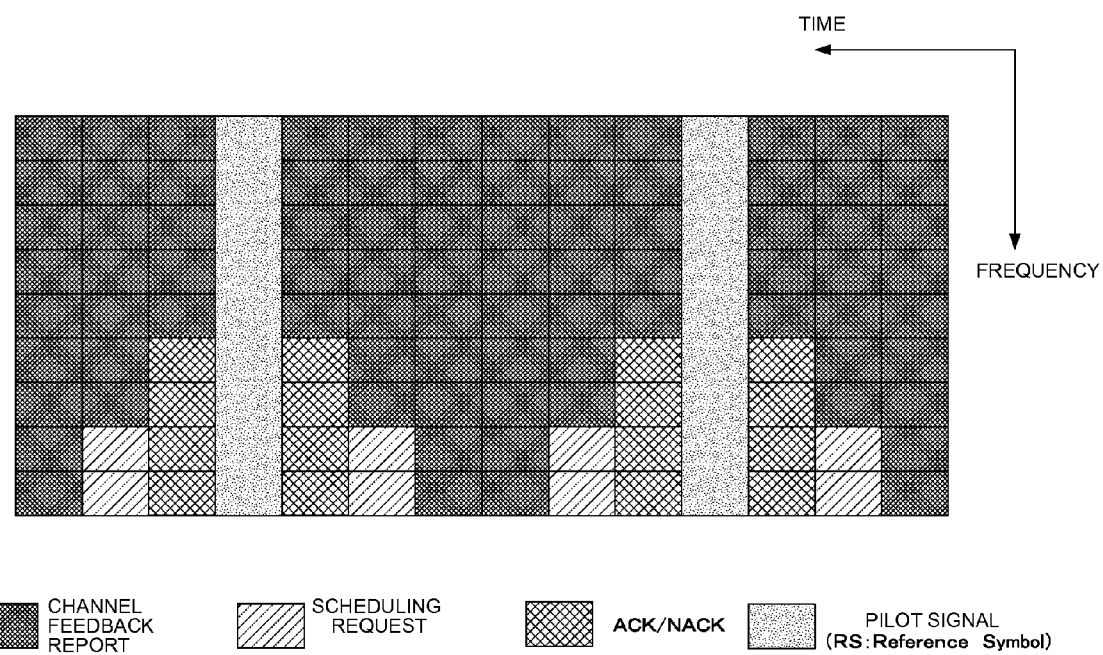
FIG. 9 is a diagram illustrating an example of multiplexing when a mobile station apparatus transmits a channel feedback report and a scheduling request at the same time using a PUSCH.

Similarly, FIG. 9 is a diagram illustrating an example of multiplexing when the mobile station apparatus transmits the channel feedback report and the scheduling request at the same time using the PUSCH. When multiplexing the channel feedback report and the scheduling request, the mobile station apparatus maps the scheduling request at a position adjacent to the ACK/NACK with respect to the time axis direction and then multiplexes the scheduling request with the channel feedback report. Similar to FIG. 8, in addition to the channel feedback report and the scheduling request, the ACK/NACK and the RS for the downlink data are illustrated. As explained in FIG. 8, first, the mobile station apparatus maps the channel feedback report in the time axis direction and after mapping the channel feedback report to all the regions in the time axis direction, the mobile station apparatus maps the channel feedback report in the frequency axis direction (time first mapping). Here, the number of regions to which the channel feedback report is mapped differs depending on the MCS (Modulation and Coding Scheme, modulation scheme, and/or coding scheme) of the channel feedback report (the modulation scheme and/or the coding scheme of the channel feedback report may be fixed to default values). After the channel feedback report is mapped to all the regions, the ACK/NACK is mapped adjacent to the RS (as in FIG. 8, the ACK/NACK is mapped to up to the maximum number of regions (four regions) in which the ACK/NACK can be mapped, however, it is possible to map the ACK/NACK in the number of regions less than or equal to the maximum number of regions to which the ACK/NACK can be mapped), and the scheduling request is mapped adjacent to the ACK/NACK as shown in FIG. 9.

At this time, the ACK/NACK and the scheduling request are mapped by overwriting the channel feedback report (this is described as follows: the ACK/NACK and the scheduling request are mapped by puncturing the channel feedback report). By mapping the scheduling request in this manner, it is possible to reduce the burden of processing when decoding each piece of information in the base station apparatus and further, the scheduling request is mapped nearer to the RS than the channel feedback report mapped on the same time axis, and therefore, it is possible to reduce the deterioration in decoding accuracy of the scheduling request due to the channel estimation error in the base station apparatus more than the deterioration of the channel feedback report mapped on the same time axis.

Figure 10:
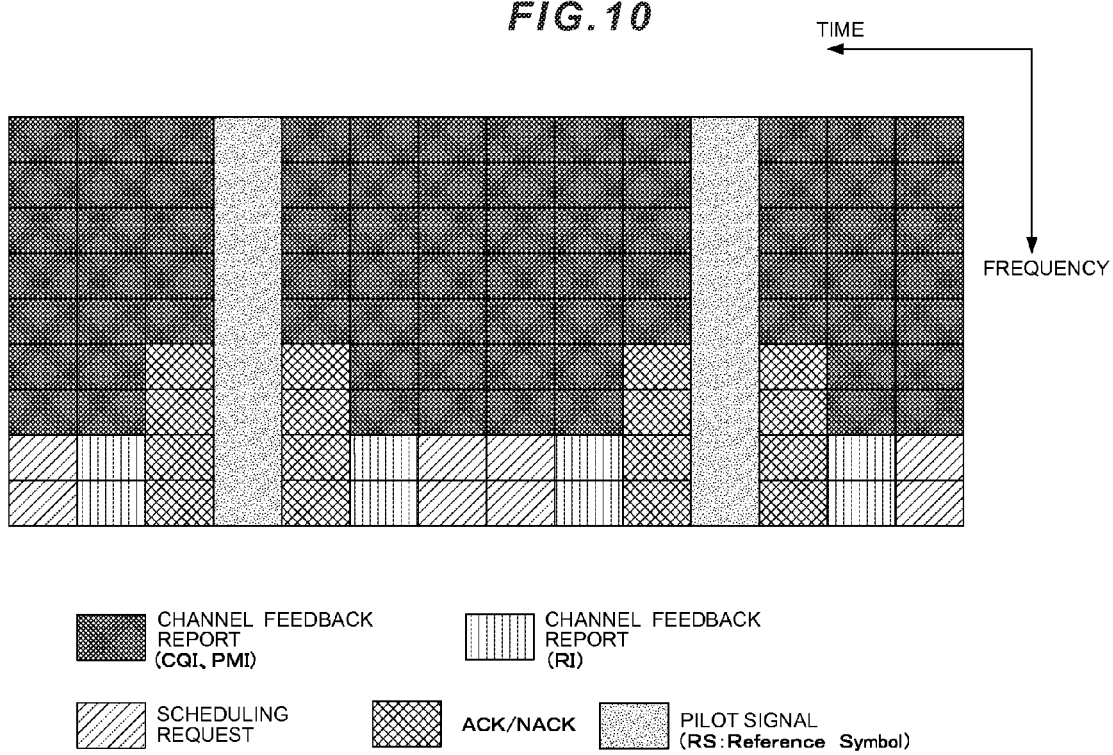
FIG. 10 is a diagram illustrating an example of multiplexing when a mobile station apparatus transmits a channel feedback report and a scheduling request at the same time using a PUSCH.

Similarly, FIG. 10 is a diagram illustrating an example of multiplexing when the mobile station apparatus transmits the channel feedback report and the scheduling request at the same time using the PUSCH. When multiplexing the channel feedback report and the scheduling request, the mobile station apparatus maps the scheduling request at a position adjacent to the RI (Rank Indicator) with respect to the time axis direction and then multiplexes the scheduling request with the channel feedback report. Similar to FIG. 8, in addition to the channel feedback report and the scheduling request, the ACK/NACK and the RS for the downlink data are illustrated. As explained in FIG. 8, first, the mobile station apparatus maps the CQI and the PMI of the channel feedback report in the time axis direction and after mapping the CQI and the PMI to all the regions in the time axis direction, the mobile station apparatus maps the CQI and the PMI in the frequency axis direction (time first mapping). Here, the number of regions to which the CQI and the PMI are mapped differs depending on the MCS (Modulation and Coding Scheme, modulation scheme, and/or coding scheme) to be applied (the modulation scheme and/or the coding scheme of the CQI and the PMI may be fixed to default values). After the CQI and the PMI are mapped to all the regions, the ACK/NACK is mapped adjacent to the RS (as in FIG. 8, the ACK/NACK is mapped to up to the maximum number of regions (four regions) in which the ACK/NACK can be mapped, however, it is possible to map the ACK/NACK in the number of regions less than or equal to the maximum number of regions to which the ACK/NACK can be mapped), and further, the RI to be transmitted as the channel feedback report is mapped adjacent to the ACK/NACK. The number of regions to which the RI is mapped also differs depending on the MCS (Modulation and Coding Scheme, modulation scheme, and/or coding scheme) to be applied (the modulation scheme and/or coding scheme of the RI may be fixed to default values).

The transmission method (number of bits (size) and transmission format) of the CQI and the PMI to be transmitted as the channel feedback is changed according to the RI. Because of this, the transmission of the RI needs to be reliable. The RI is mapped adjacent to the ACK/NACK in order to improve the reliability (to prevent deterioration in decoding accuracy due to the channel estimation error in the base station apparatus). As shown in FIG. 10, the scheduling request is mapped adjacent to the RI. At this time, the ACK/NACK and the scheduling request are mapped by overwriting the channel feedback report (this is described as follows: the ACK/NACK and the scheduling request are mapped by puncturing the channel feedback report). By mapping the scheduling request in this manner, it is possible to reduce the burden of processing when decoding each piece of information in the base station apparatus and further, the scheduling request is mapped nearer to the RS than the CQI and the PMI mapped on the same time axis, and therefore, it is possible to reduce the deterioration in decoding accuracy of the scheduling request due to the channel estimation error in the base station apparatus more than the deterioration of the CQI and the PMI mapped on the same time axis.

Figure 11:
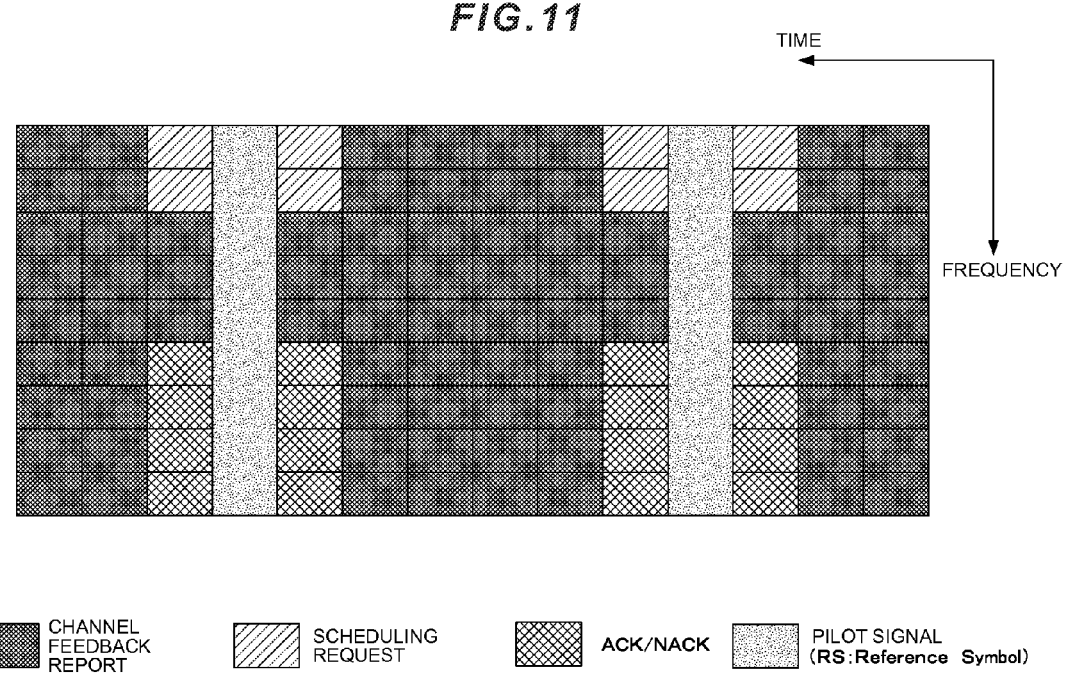
FIG. 11 is a diagram illustrating another example of multiplexing when a mobile station apparatus transmits a channel feedback report and a scheduling request at the same time using a PUSCH.

Similarly, FIG. 11 is a diagram illustrating another example of multiplexing when the mobile station apparatus transmits the channel feedback report and the scheduling request at the same time using the PUSCH. When multiplexing the channel feedback report and the scheduling request, the mobile station apparatus maps the scheduling request at a position adjacent to the uplink reference signal with respect to the time axis direction and at a position on the opposite side of an ACK/NACK adjacent to the uplink reference signal with respect to the frequency axis direction, and then multiplexes the scheduling request with the channel feedback report. Similar to FIG. 8, in addition to the channel feedback report and the scheduling request, the ACK/NACK and the RS for the downlink data are illustrated. As explained in FIG. 8, first, the mobile station apparatus maps the channel feedback report in the time axis direction and after mapping the channel feedback report to all the regions in the time axis direction, the mobile station apparatus maps the channel feedback report in the frequency axis direction (time first mapping). Here, the number of regions to which the channel feedback report is mapped differs depending on the MCS (Modulation and Coding Scheme, modulation scheme, and/or coding scheme) of the channel feedback report (the modulation scheme and/or the coding scheme of the channel feedback report may be fixed to default values). After the channel feedback report is mapped to all the regions, the ACK/NACK is mapped adjacent to the RS (as in FIG. 8, the ACK/NACK is mapped to up to the maximum number of regions (four regions) to which the ACK/NACK can be mapped, however, it is possible to map the ACK/NACK in the number of regions less than or equal to the maximum number of regions to which the ACK/NACK can be mapped), and the scheduling request is mapped on the opposite side of the ACK/NACK in the frequency axis direction.

At this time, the ACK/NACK and the scheduling request are mapped by overwriting the channel feedback report (this is described as follow: the ACK/NACK and the scheduling request are mapped by puncturing the channel feedback report). Here, in FIG. 11, the scheduling request is mapped to regions of lower frequencies along the frequency axis and the ACK/NACK is mapped to regions of higher frequencies along the frequency axis, however, it may also be possible to map the scheduling request and the ACK/NACK in the opposite positions. That is, it is possible to map the scheduling request adjacent to the RS to regions of higher frequencies along the frequency axis and to map the ACK/NACK adjacent to the RS to regions of lower frequencies on the opposite side. By mapping the scheduling request as shown in FIG. 11, it is possible for the base station apparatus to decode the scheduling request without the need to take into consideration the regions (number of regions) to which the ACK/NACK is mapped.

Here, it may also be possible for the mobile station apparatus to map the scheduling request without overwriting the channel feedback report (without puncturing the channel feedback report) at the time of multiplexing when transmitting the channel feedback report and the scheduling request at the same time using the PUSCH. FIG. 12 to FIG. 15 illustrates examples in which the channel feedback report and the scheduling request are multiplexed without overwriting the channel feedback report. FIG. 14 illustrates an example in which the channel feedback report and the scheduling request are multiplexed without overwriting the CQI and the PMI. In FIG. 12 to FIG. 15, in addition to the channel feedback report and the scheduling request, the ACK/NACK and the RS are illustrated. FIG. 12, FIG. 13, FIG. 14 and FIG. 15 correspond to FIG. 8, FIG. 9, FIG. 10 and FIG. 11, respectively.

Figure 12:
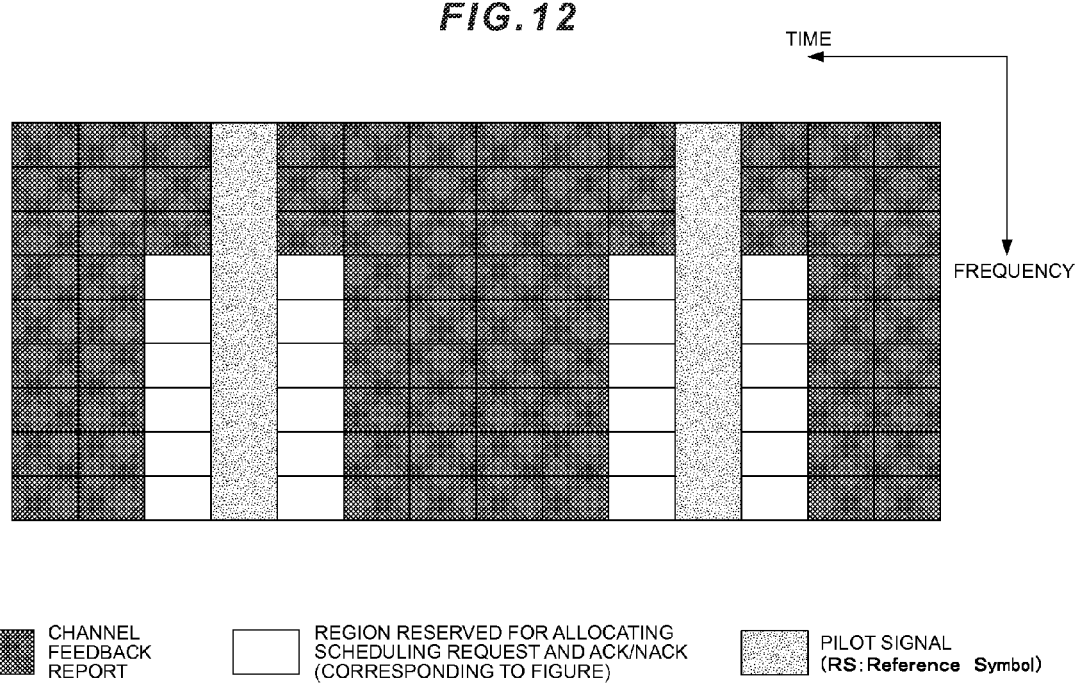
FIG. 12 illustrates an example of multiplexing a channel feedback report and a scheduling request without overwriting the channel feedback report.

FIG. 12 is explained. FIG. 12 corresponds to the multiplexing method in FIG. 8. As explained in FIG. 8, first, the mobile station apparatus maps the channel feedback report in the time axis direction and after mapping the channel feedback report to all the regions in the time axis direction, the mobile station apparatus maps the channel feedback report in the frequency axis direction (time first mapping). At this time, it is possible for the mobile station apparatus to reserve regions in advance to which the ACK/NACK and the scheduling request are mapped, and then map the channel feedback report. Here, it may also be possible to design the configuration so that information indicative of the NACK is included in the reserved region in ordinary cases and the ACK is mapped therein only when transmitting the ACK.

FIG. 12 shows that the mobile station apparatus reserves regions (shown in white) to which the ACK/NACK and the scheduling request are mapped, and then maps the channel status. The regions to which the ACK/NACK and the scheduling request are mapped are defined in advance by the specifications etc. As shown in FIG. 12, it is possible for the mobile station apparatus to reserve regions to which the ACK/NACK is mapped, and then map the channel feedback report, and map the ACK/NACK to the reserved region to transmit the ACK/NACK when transmitting the ACK/NACK. Here, it may also be possible to design the configuration so that information indicative of the NACK is included in the region reserved to map the ACK/NACK in ordinary cases and the ACK is mapped therein only when transmitting the ACK.

Similarly, it is possible for the mobile station apparatus to reserve regions to which the scheduling request is mapped, and then map the channel feedback report, and map the scheduling request to the reserved region to transmit the scheduling request when transmitting the scheduling request. Here, it may also be possible to design the configuration so that information indicative of "0: without scheduling request" is included in the region reserved to map the scheduling request in ordinary cases and "1: scheduling request" is mapped therein only when transmitting information indicative of "1: scheduling request". When the mobile station apparatus transmits the channel feedback report and the scheduling request at the same time using the PUSCH, it is possible to transmit all the channel feedback reports and the scheduling requests without missing part of the channel feedback report by reserving regions to which the scheduling request is mapped, to map the channel feedback report.

Figure 13:
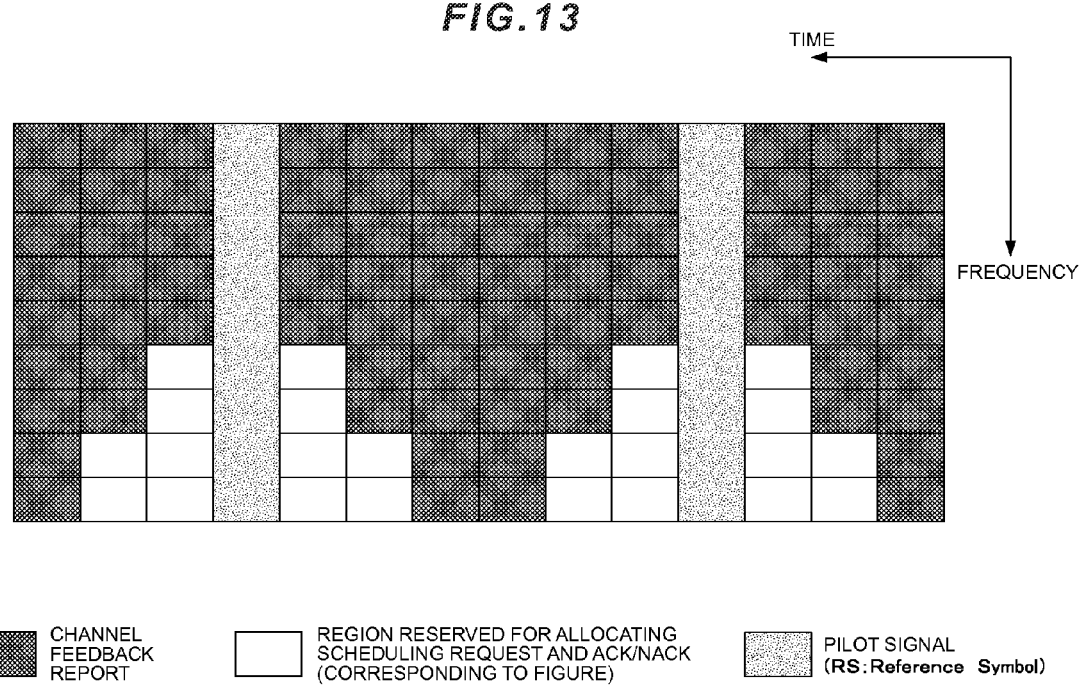
FIG. 13 illustrates an example of multiplexing a channel feedback report and a scheduling request without overwriting the channel feedback report.
Figure 14:
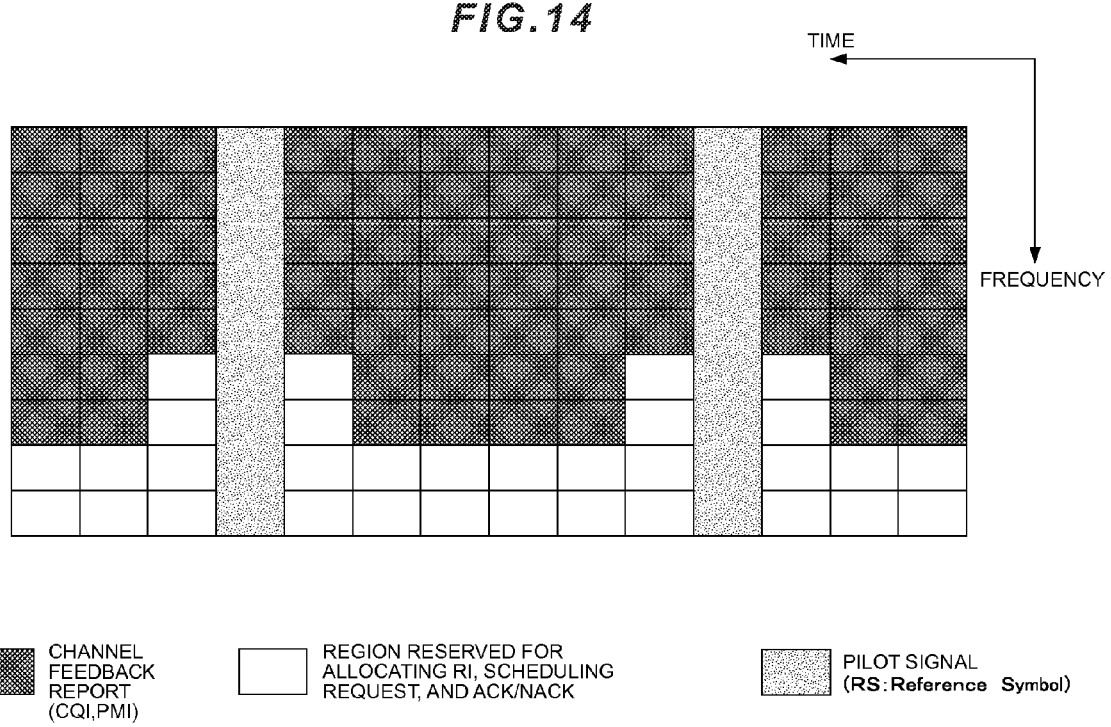
FIG. 14 illustrates an example of multiplexing a channel feedback report and a scheduling request without overwriting the channel feedback report.

FIG. 13 corresponds to the multiplexing method in FIG. 9. It is possible for the mobile station apparatus to reserve regions (shown in white) to which the ACK/NACK and the scheduling request defined in advance by the specifications etc., and then map the channel feedback report, and map the ACK/NACK to the reserved region to transmit the ACK/NACK when transmitting the ACK/NACK and map the scheduling request to the reserved region to transmit the scheduling request when transmitting the scheduling request. As explained also in FIG. 12, it may also be possible to design the configuration so that information indicative of the NACK is included in the region reserved to map the ACK/NACK in ordinary cases and the ACK is mapped therein only when transmitting the ACK. Further, it may also be possible to design the configuration so that information indicative of "0: without scheduling request" is included in the region reserved to map the scheduling request in ordinary cases and "1: scheduling request" is mapped therein only when transmitting information indicative of "1: scheduling request".

FIG. 14 corresponds to FIG. 10. The mobile station apparatus reserves regions (shown in white) to which the RI, the ACK/NACK, and the scheduling request are mapped, defined in advance by the specifications etc., and then maps the CQI and the PMI. The region to which the RI is mapped is defined by the specifications etc. When transmitting the ACK/NACK, it is possible for the mobile station apparatus to transmit the ACK/NACK by mapping the ACK/NACK to the reserved region. Also when transmitting the scheduling request, it is possible for the mobile station apparatus to transmit the scheduling request by mapping the scheduling request to the reserved region. When transmitting the RI, it is possible to transmit the RI by mapping the RI to the reserved region. Here, as explained also in FIG. 12, it may also be possible to design the configuration so that information indicative of the NACK is included in the region reserved to map the ACK/NACK in ordinary cases and the ACK is mapped therein only when transmitting the ACK. Further, it may also be possible to design the configuration so that information indicative of "0: without scheduling request" is included in the region reserved to map the scheduling request in ordinary cases and "1: scheduling request" is mapped therein only when transmitting information indicative of "1: scheduling request". Furthermore, it may also be possible to design the configuration so that the transmitted RI is mapped as it is to the region reserved to transmit the RI, and new RI is mapped therein only when changing the RI.

Figure 15:
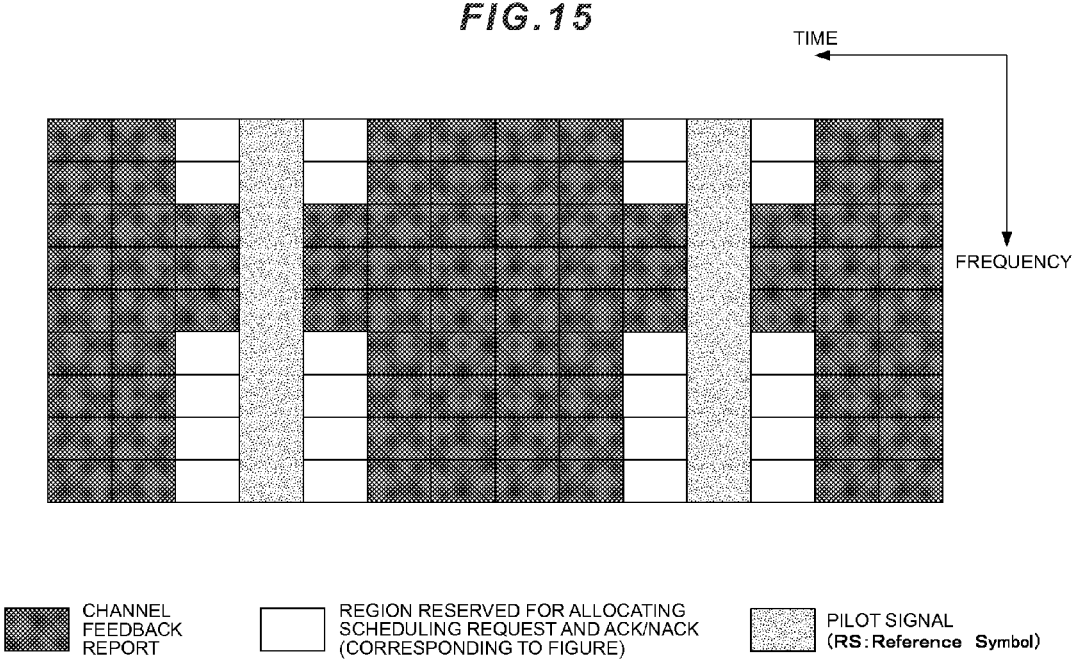
FIG. 15 illustrates an example of multiplexing a channel feedback report and a scheduling request without overwriting the channel feedback report.

FIG. 15 corresponds to the multiplexing method in FIG. 11. It is possible for the mobile station apparatus to reserve regions (shown in white) to which the ACK/NACK and the scheduling request defined in advance by the specifications etc., and then map the channel feedback report, and map the ACK/NACK to the reserved region to transmit the ACK/NACK when transmitting the ACK/NACK and map the scheduling request to the reserved region to transmit the scheduling request when transmitting the scheduling request. Here, as explained also in FIG. 12, it may also be possible to design the configuration so that information indicative of the NACK is included in the region reserved to map the ACK/NACK in ordinary cases and the ACK is mapped therein only when transmitting the ACK. Further, it may also be possible to design the configuration so that information indicative of "0: without scheduling request" is included in the region reserved to map the scheduling request in ordinary cases and "1: scheduling request" is mapped therein only when transmitting information indicative of "1: scheduling request".

Here, obviously it is possible for the mobile station apparatus to reserve region to which the scheduling request is mapped, and then map the channel feedback report, and map the ACK/NACK by puncturing the channel feedback report. Further, obviously it is possible for the mobile station apparatus to reserve region to which the ACK/NACK is mapped, and then map the channel feedback report, and map the scheduling request by puncturing the channel feedback report.

Figure 16:
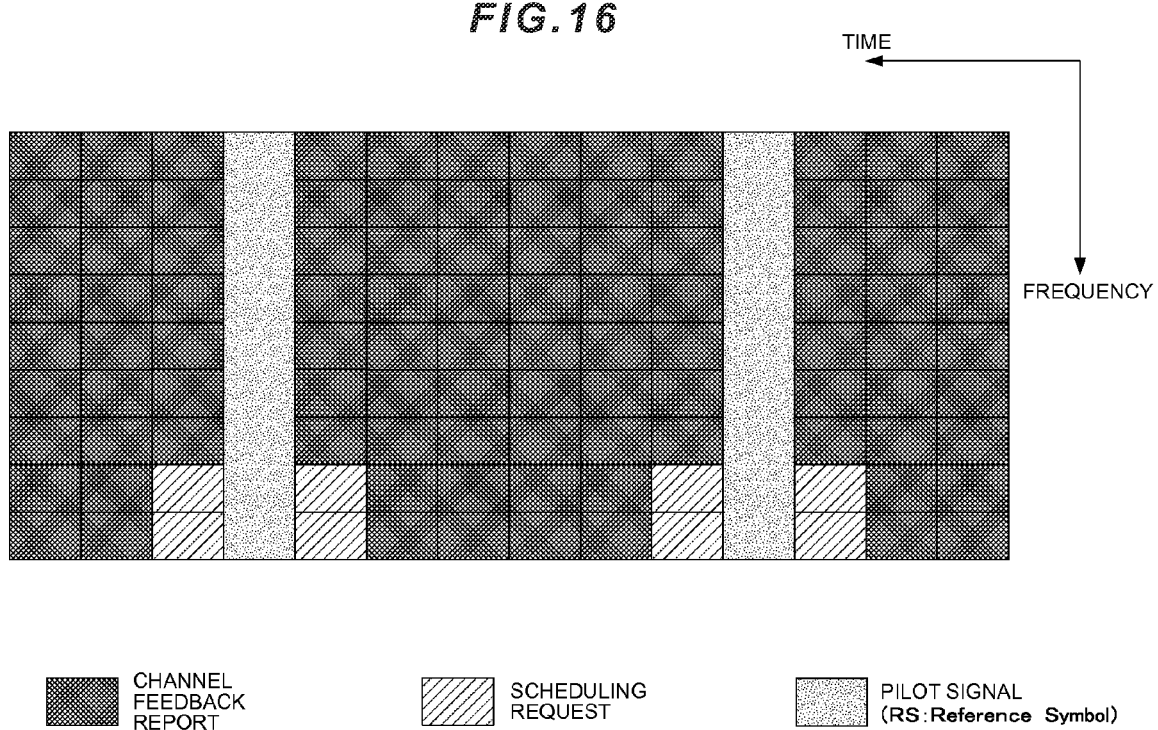
FIG. 16 illustrates another example of multiplexing when a mobile station apparatus transmits a channel feedback report and a scheduling request at the same time using a PUSCH.

Similarly, FIG. 16 illustrates another example of multiplexing when the mobile station apparatus transmits the channel feedback report and the scheduling request at the same time using the PUSCH. In FIG. 16, no regions to which the ACK/NACK is mapped are reserved. That is, the multiplexing method for the mobile station apparatus to transmit, simultaneously using the PUSCH, the three pieces of information, that is, the channel feedback report, the ACK/NACK, and the scheduling request and the multiplexing method for the mobile station apparatus to transmit, simultaneously using the PUSCH, the two pieces of information, that is, the channel information and the scheduling request are defined, respectively, and it is possible for the mobile station apparatus to switch the multiplexing methods for transmission depending on the information to transmit (whether to transmit the channel feedback report, the ACK/NACK, and the scheduling request simultaneously or to transmit the channel feedback report and the scheduling request simultaneously).

FIG. 16 is an example of multiplexing when transmitting the channel feedback report and the scheduling request and the channel feedback report is mapped adjacent to the RS on one side of frequency (in FIG. 16, the channel feedback report is mapped on the side of higher frequencies, however, it may also be mapped on the side of lower frequencies). The number of regions to which the channel feedback report is mapped differs depending on the MSC (Modulation and Coding Scheme, modulation scheme, and/or coding scheme) of the channel feedback report (the modulation scheme and/or the coding scheme of the channel feedback report may be fixed to default values). At this time, it may also be possible for the mobile station apparatus to map the scheduling request by puncturing the channel feedback report or to map the channel feedback report by reserving region to which the scheduling request, determined in advance by the specifications etc., is mapped. As explained also in FIG. 12, it may also be possible to design the configuration so that information indicative of "0: without scheduling request" is included in the region reserved to map the scheduling request in ordinary cases and "1: scheduling request" is mapped therein only when transmitting information indicative of "1: scheduling request". It is possible for the mobile station apparatus to transmit more channel feedback report than when the ACK/NACK is not present to the base station apparatus by using different multiplexing methods when transmitting the channel feedback report, the ACK/NACK, and the scheduling request at the same time and when transmitting the channel feedback report and the scheduling request.

As explained above, according to the first embodiment of the present invention, it is possible for the base station apparatus to switch the AMC modes in accordance with the channel feedback report transmitted from the mobile station apparatus and to allocate resources if the mobile station apparatus transmits the scheduling request requesting the allocation of the resources for the mobile station apparatus to transmit the uplink data (requesting the transmission of the UL-SCH) together with the channel feedback report at the same time using the PUSCH. That is, it is possible for the base station apparatus to determine appropriate AMC mode based on the channel feedback report transmitted at the same time when allocating the resources of the PUSCH in accordance with the scheduling request from the mobile station apparatus.

Further, it is possible for the base station apparatus to allocate the resources of the PUSCH with appropriate AMC mode to the mobile station apparatus and to perform an efficient communication control between the base station apparatus and the mobile station apparatus. It is also possible for the mobile station apparatus to transmit the channel feedback report and the scheduling request at the same time, and therefore, it is possible to transmit the scheduling request even when the mobile station apparatus transmits only the channel feedback report using the PUSCH and to rapidly transmit the uplink data (to perform rapid transmission of the UL-SCH).

In multiplexing when the mobile station apparatus transmits the channel feedback report and the scheduling request at the same time using the PUSCH, by mapping the scheduling request adjacent to the RS, it is possible to reduce the deterioration in decoding accuracy of the scheduling request due to a channel estimation error in the base station apparatus and for the scheduling request to have a robust durability against channel variations. Similarly, in multiplexing when the mobile station apparatus transmits the channel feedback report and the scheduling request at the same time using the PUSCH, by mapping the scheduling request adjacent to the ACK/NACK, it is possible to reduce the burden of processing when decoding the channel feedback report, the ACK/NACK, and the scheduling request in the base station apparatus.

Second Embodiment

In the first embodiment described above, because of the convenience of explanation, the case is explained as an example, where the base station apparatus and the mobile station apparatus correspond to each other in a one-to-one manner, however, it is obvious that a plurality of base station apparatuses and a plurality of mobile station apparatuses may present.

In the embodiments described above, it may also be possible to control the base station apparatus and the mobile station apparatus by causing a computer-readable recording medium to record programs for realizing each function of the base station apparatus and each function of the mobile station apparatus, causing a computer system to read and execute the programs recorded in the recording medium. Here, the "computer system" is supposed to include an OS and hardware, such as peripheral equipment. The "computer-readable recording medium" refers to a flexible disc, a magneto-optical disc, a portable medium, such as ROM and CD-ROM, and a storage device, such as a hard disc incorporated in a computer system. Further, the "computer-readable recording medium" is supposed to include that which dynamically holds a program in a brief time, such as a communication wire when the program is transmitted via a network, such as the Internet, and a communication line such as a telephone line and that which holds a program for a fixed period of time, such as a nonvolatile memory inside a computer system, which serves as a server or client in such a case. The above-mentioned program may be that which realizes part of the functions described above and that which realizes the functions described above in combination with programs already recorded in a computer system.

As above, the embodiments of the present invention are described in detail with reference to the drawings, however, the specific configurations are not limited to the embodiments and designs etc. that do not deviate from the gist of the present invention are also included in the scope of claims.

The invention claimed is:

1. A mobile station apparatus that communicates with a base station apparatus, the mobile station apparatus comprising:
   a transmitting unit configured to transmit, to the base station apparatus, a scheduling request in a subframe in which channel state information without an uplink shared channel (UL-SCH) data is aperiodically transmitted using a physical uplink shared channel, wherein the scheduling request is used for requesting resources for UL-SCH transmission.

2. A wireless communication method in a mobile station apparatus that communicates with a base station apparatus, the wireless communication method comprising:
   transmitting, to the base station apparatus, a scheduling request in a subframe in which channel state information without an uplink shared channel (UL-SCH) data is aperiodically transmitted using a physical uplink shared channel, wherein the scheduling request is used for requesting resources for UL-SCH transmission.

3. A base station apparatus that communicates with a mobile station apparatus, the base station apparatus comprising:
   a receiving unit configured to receive, from the mobile station apparatus, a scheduling request in a subframe in which channel state information without an uplink shared channel (UL-SCH) data is aperiodically transmitted, by the mobile station apparatus, using a physical uplink shared channel, wherein the scheduling request is used for requesting resources for UL-SCH transmission.

4. A wireless communication method used in a base station apparatus that communicates with a mobile station apparatus, the wireless communication method comprising:
   receiving, from the mobile station apparatus, a scheduling request in a subframe in which channel state information without an uplink shared channel (UL-SCH) data is aperiodically transmitted, by the mobile station apparatus, using a physical uplink shared channel, wherein the scheduling request is used for requesting resources for UL-SCH transmission.

* * * * *